US012707086B2

(12) United States Patent
Nishi et al.

(10) Patent No.: US 12,707,086 B2
(45) Date of Patent: Aug. 11, 2026

(54) THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Takahiro Nishi, Nara (JP); Toshiyasu Sugio, Osaka (JP); Noritaka Iguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 259 days.

(21) Appl. No.: 18/522,711

(22) Filed: Nov. 29, 2023

(65) Prior Publication Data

US 2024/0137565 A1 Apr. 25, 2024

Related U.S. Application Data

(63) Continuation of application No. PCT/JP2022/022390, filed on Jun. 1, 2022.

(Continued)

(51) Int. Cl.

*H04N 19/597* (2014.01)
*H04N 19/159* (2014.01)
*H04N 19/70* (2014.01)

(52) U.S. Cl.

CPC ......... *H04N 19/597* (2014.11); *H04N 19/159* (2014.11); *H04N 19/70* (2014.11)

(58) Field of Classification Search

CPC .... H04N 19/597; H04N 19/159; H04N 19/70; G06T 9/00

See application file for complete search history.

(56) References Cited

U.S. PATENT DOCUMENTS

2014/0375638 A1 12/2014 Tomaru et al.
2021/0049790 A1* 2/2021 Gao .......................... G06T 9/00

(Continued)

FOREIGN PATENT DOCUMENTS

WO 2014/020663 2/2014
WO WO-2022019713 A1 * 1/2022 ............ H04N 19/11

OTHER PUBLICATIONS

International Search Report (ISR) issued on Aug. 16, 2022 in International (PCT) Application No. PCT/JP2022/022390.

*Primary Examiner* — Shefali D Goradia
(74) *Attorney, Agent, or Firm* — Wenderoth, Lind & Ponack, L.L.P.

(57) ABSTRACT

A three-dimensional data decoding method includes: selecting, from among contexts, a first context for an encoded first information item to be processed; and arithmetic-decoding the encoded first information item to be processed, using the first context, to generate a first information item to be processed. Encoded first information items including the encoded first information item to be processed are included in a bitstream generated by encoding an information item about positions of three-dimensional points. The encoded first information items are generated by arithmetic-encoding first information items including the first information item to be processed. The first information items each correspond to a different one of reference positions and indicate whether a three-dimensional point corresponding to a reference position corresponding to the first information item is present.

14 Claims, 11 Drawing Sheets

Related U.S. Application Data

(60) Provisional application No. 63/209,111, filed on Jun. 10, 2021, provisional application No. 63/208,264, filed on Jun. 8, 2021.

(56) References Cited

U.S. PATENT DOCUMENTS

2023/0291895 A1* 9/2023 Lee ........................ H04N 19/96
2024/0054682 A1* 2/2024 Bai ........................... G06T 9/00

* cited by examiner

Figure 1:
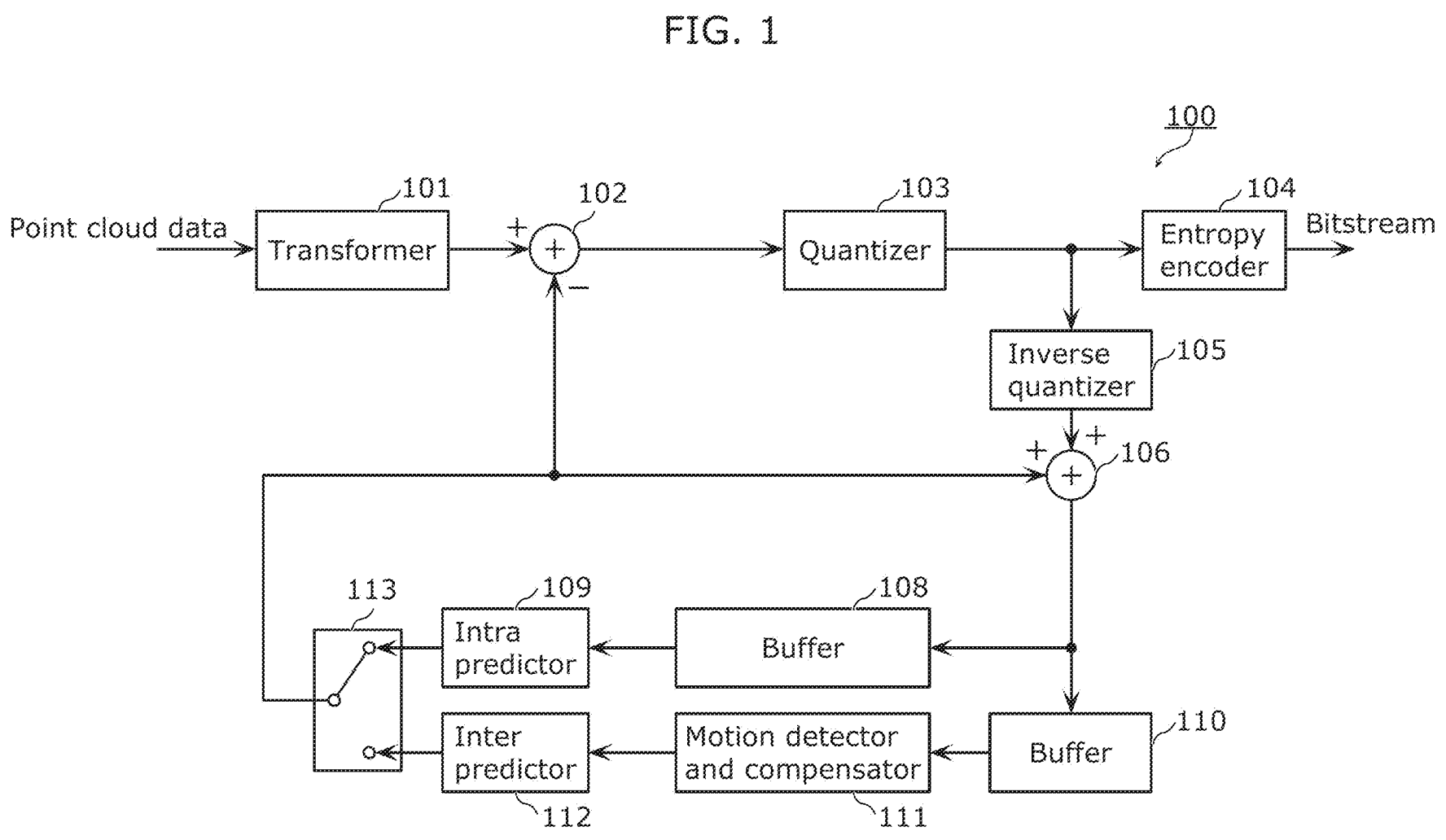

Point cloud data
Transformer 101
102
Quantizer 103
Entropy encoder 104
Bitstream
Inverse quantizer 105
106
Buffer 108
Intra predictor 109
Buffer 110
Motion detector and compensator 111
Inter predictor 112
113

Figure 3:
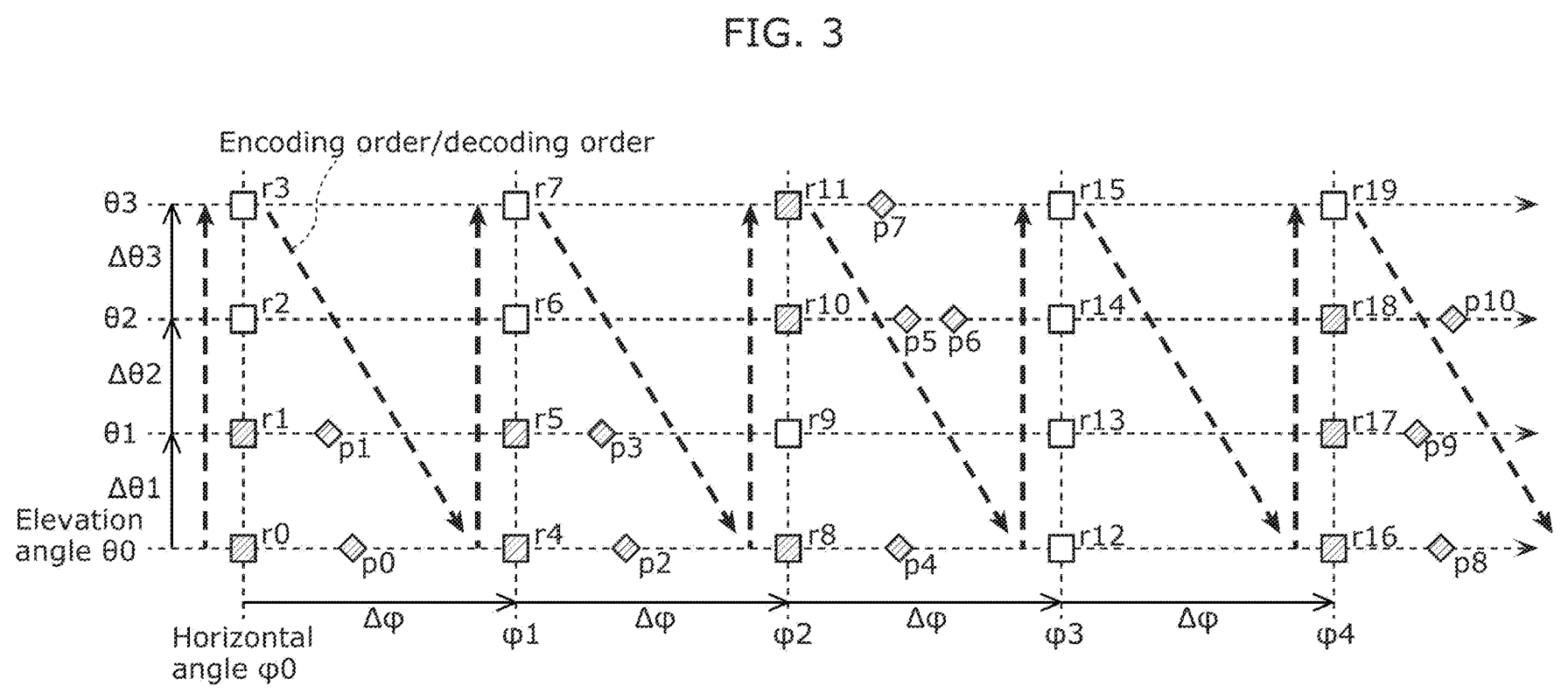

Encoding order/decoding order
Elevation angle θ0
θ1
θ2
θ3
Δθ1
Δθ2
Δθ3
Horizontal angle φ0
φ1
φ2
φ3
φ4
Δφ
r0 r1 r2 r3 r4 r5 r6 r7 r8 r9 r10 r11 r12 r13 r14 r15 r16 r17 r18 r19
p0 p1 p2 p3 p4 p5 p6 p7 p8 p9 p10

FIG. 4

| geometry_prediction_tree_node( ) { | **Descriptor** |
|---|---|
| if( first_point_in_column ) | |
| while( true ) { | |
| **next_column_flag** | ae(v) |
| if( !next_column_flag){ | |
| first_point_in_column = 0 | |
| break | |
| } | |
| column_pos++ | |
| } | |
| **next_row_flag** | ae(v) |
| if( next_row_flag ){ | |
| row_pos++ | |
| if( row_pos == num_rows ){ | |
| row_pos = 0 | |
| column_pos++ | |
| first_point_in_column = 1 | |
| } | |
| } | |
| else{ | |
| **pred_mode** | ae(v) |
| **residual_radius** | ae(v) |
| **residual_phi** | ae(v) |
| **residual_x** | ae(v) |
| **residual_y** | ae(v) |
| **residual_z** | ae(v) |
| } | |
| ... | |
| } | |

FIG. 5

| geometry_prediction_tree_node( ) { | **Descriptor** |
|---|---|
|   **next_row_flag** | ae(v) |
|   if( next_row_flag ){ | |
|     row_pos++ | |
|     if( row_pos == num_rows ){ | |
|       row_pos = 0 | |
|       column_pos++ | |
|     } | |
|     if( row_pos == 0 ){ | |
|       while( true ) { | |
|         **next_column_flag** | ae(v) |
|         if( !next_column_flag) | |
|           break | |
|         column_pos++ | |
|       } | |
|     } | |
|   } | |
|   else{ | |
|     **pred_mode** | ae(v) |
|     **residual_radius** | ae(v) |
|     **residual_phi** | ae(v) |
|     **residual_x** | ae(v) |
|     **residual_y** | ae(v) |
|     **residual_z** | ae(v) |
|   } | |
|   ... | |
| } | |

FIG. 6

Processed range

Horizontal angle φj

Elevation angle θ0

Col
RefPt
Δφ
Horizontal angle φj
θ3
Δθ3
θ2
Δθ2
θ1
Δθ1
Elevation angle θ0

THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This is a continuation application of PCT International Application No. PCT/JP2022/022390 filed on Jun. 1, 2022, designating the United States of America, which is based on and claims priority of U.S. Provisional Patent Application No. 63/208,264 filed on Jun. 8, 2021 and U.S. Provisional Patent Application No. 63/209,111 filed on Jun. 10, 2021. The entire disclosures of the above-identified applications, including the specifications, drawings and claims are incorporated herein by reference in their entirety.

FIELD

The present disclosure relates to a three-dimensional data encoding method, a three-dimensional data decoding method, a three-dimensional data encoding device, and a three-dimensional data decoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

CITATION LIST

Patent Literature

PTL 1: International Publication WO 2014/020663

SUMMARY

Technical Problem

There has been a demand for improving coding efficiency in a three-dimensional data encoding process and a three-dimensional data decoding process.

The present disclosure has an object to provide a three-dimensional data encoding method, a three-dimensional data decoding method, a three-dimensional data encoding device, or a three-dimensional data decoding device that is capable of improving coding efficiency.

Solution to Problem

A three-dimensional data encoding method according to one aspect of the present disclosure comprising: determining, from among reference positions, a reference position corresponding to each of three-dimensional points; generating first information items each of which corresponds to a different one of the reference positions and indicates whether a three-dimensional point corresponding to a reference position corresponding to the first information item is present; selecting, from among contexts, a first context for a first information item to be processed that is included in the first information items; and arithmetic-encoding the first information item to be processed, using the first context.

A three-dimensional data decoding method according to one aspect of the present disclosure comprising: selecting, from among contexts, a first context for an encoded first information item to be processed; and arithmetic-decoding the encoded first information item to be processed, using the first context, to generate a first information item to be processed, wherein encoded first information items including the encoded first information item to be processed are included in a bitstream generated by encoding an information item about positions of three-dimensional points, the encoded first information items are generated by arithmetic-encoding first information items including the first information item to be processed, and the first information items each correspond to a different one of reference positions and indicate whether a three-dimensional point corresponding to a reference position corresponding to the first information item is present.

Advantageous Effects

The present disclosure provides a three-dimensional data encoding method, a three-dimensional data decoding method, a three-dimensional data encoding device, or a three-dimensional data decoding device that is capable of improving coding efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a block diagram of a three-dimensional data encoding device according to an embodiment.

FIG. 2 is a block diagram of a three-dimensional data decoding device according to the embodiment.

FIG. 3 is a diagram illustrating an encoding order of three-dimensional points according to the embodiment.

FIG. 4 is a diagram illustrating an example of syntax of a geometry information item according to the embodiment.

FIG. 5 is a diagram illustrating an example of syntax of a geometry information item according to the embodiment.

FIG. 6 is a diagram illustrating a reference range in selecting a context according to the embodiment.

FIG. 8 is a diagram illustrating a reference frame in inter prediction according to the embodiment.

DESCRIPTION OF EMBODIMENT

Figure 7:
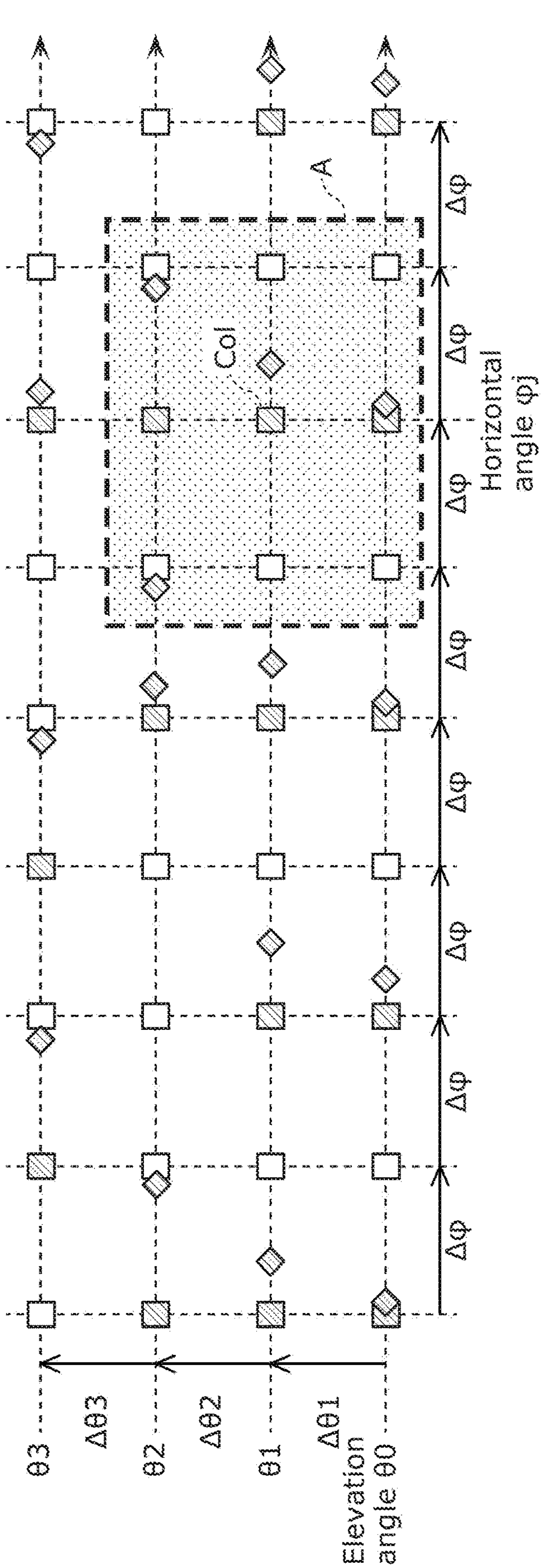
FIG. 7 is a diagram illustrating a reference frame in selecting a context according to the embodiment.

A three-dimensional data encoding method according to one aspect of the present disclosure includes: determining, from among reference positions, a reference position corresponding to each of three-dimensional points; generating first information items each of which corresponds to a different one of the reference positions and indicates whether a three-dimensional point corresponding to a reference position corresponding to the first information item is present; selecting, from among contexts, a first context for a first information item to be processed that is included in the first information items; and arithmetic-encoding the first information item to be processed, using the first context.

Accordingly, the three-dimensional data encoding method is capable of arithmetic-encoding a first information item on a target point, using the first context selected from among the contexts. Accordingly, for example, a context appropriate to each first information item can be used. Therefore, coding efficiency can be improved.

For example, in the selecting of the first context, the first context may be selected based on an information item about a reference position corresponding to an encoded three-dimensional point among the reference positions.

For example, the information item about the reference position corresponding to the encoded three-dimensional point may be a first information item corresponding to the reference position corresponding to the encoded three-dimensional point.

Accordingly, the three-dimensional data encoding method is capable of appropriately selecting a context based on the first information item corresponding to the reference position corresponding to the encoded three-dimensional point. Here, a value of the first information item has a high correlation with values of other first information items in a predetermined range in at least one of a temporal direction and a spatial direction. That is, there is a high possibility that, in the vicinity of the first information item, a first information item having the same value appears in the at least one of the temporal direction or the spatial direction. Therefore, by selecting a context, using a first information item corresponding to a reference position corresponding to an encoded three-dimensional point, a context can be used with consideration given to correlation. Thus, it may be possible to reduce an encoding amount.

For example, the information item about the positions of the three-dimensional points may express each of the positions using a distance component, a first direction component, and a second direction component.

Accordingly, in the three-dimensional data encoding method, coding efficiency can be improved in encoding an information item about a position that is expressed with the distance component, the first direction component, and the second direction component.

For example, each of the reference positions may contain the first direction component and the second direction component, and in the selecting of the first context, the first context may be selected based on an information item about a first reference position that corresponds to an encoded three-dimensional point and contains a first direction component having a same value as a first direction component contained in a second reference position corresponding to the first information item to be processed.

Accordingly, in the three-dimensional data encoding method, the first context can be selected appropriately by referring to an information item about a reference position that includes a first direction component having the same value as a first direction component included in a reference position to be processed. Here, in what is called polar coordinates, when values of first direction components are assumed to be the same, values of first information items have high correlations even when values of second direction components are different. Therefore, by selecting a context, referring to the information item about the reference position that includes the first direction component having the same value as the first direction component included in the reference position to be processed, a context can be used with consideration given to correlation. Thus, it may be possible to reduce an encoding amount.

For example, first information items corresponding to reference positions may be arithmetic-encoded in an order based on the first direction component in a processing unit composed of the first information items, the reference positions containing second direction components having a same value.

Accordingly, by arithmetic-encoding first information items in a determined order, it may be possible that the same value is more likely to appear in processed first information items compared with the case where the first information items are arithmetic-encoded in no particular order. Accordingly, it may be possible to reduce a code amount in arithmetic encoding using a context.

For example, the first direction component may be a vertical component, the second direction component may be a horizontal component, and the first information items may be arithmetic-encoded in the order based on the vertical component.

Accordingly, there is continuity in presence or absence of points to be processed in the vertical direction. It may be possible to reduce an encoding amount in arithmetic encoding.

For example, each of the reference positions may contain the first direction component and the second direction component, and the three-dimensional data encoding method may further comprise: calculating a first difference between a value of the first direction component of a three-dimensional point to be processed and a value of the first direction component contained in a first reference position corresponding to the three-dimensional point to be processed.

Accordingly, in the three-dimensional data encoding method, coding efficiency can be improved by calculating the first difference between the value of the first direction component of the three-dimensional point to be processed and the value of the first direction component of the first reference position.

For example, the three-dimensional data encoding method may further comprise: calculating a second difference between a value of the first direction component of an encoded three-dimensional point and a value of the first direction component contained in a second reference position corresponding to the encoded three-dimensional point; and calculating a third difference that is a difference between the first difference and the second difference.

Accordingly, in the three-dimensional data encoding method, coding efficiency can be further improved.

For example, the reference positions may correspond to sampling positions in a sensor for generating the three-dimensional points.

For example, when intra prediction is applied to a three-dimensional point to be processed, the first context may be selected by a first method, and when inter prediction is applied to the three-dimensional point to be processed, the first context may be selected by a second method that is different from the first method.

Accordingly, in the three-dimensional data encoding method, a context appropriate to each of the intra prediction and the inter prediction can be selected. Thus, coding efficiency can be improved.

For example, in the second method, the first context may be selected by reference to a processed frame that is different from a frame to be processed that includes the three-dimensional point to be processed.

Accordingly, in the three-dimensional data encoding method, a context appropriate to the inter prediction can be selected. Thus, coding efficiency can be improved.

A three-dimensional data decoding method according to one aspect of the present disclosure includes: selecting, from among contexts, a first context for an encoded first information item to be processed; and arithmetic-decoding the encoded first information item to be processed, using the first context, to generate a first information item to be processed, wherein encoded first information items including the encoded first information item to be processed are included in a bitstream generated by encoding an information item about positions of three-dimensional points, the encoded first information items are generated by arithmetic-encoding first information items including the first information item to be processed, and the first information items each correspond to a different one of reference positions and indicate whether a three-dimensional point corresponding to a reference position corresponding to the first information item is present.

Accordingly, the three-dimensional data decoding method is capable of arithmetic-decoding a first information item on a target point, using the first context selected from among the contexts. Accordingly, for example, a context appropriate to each first information item can be used. Therefore, the three-dimensional data decoding method is capable of appropriately arithmetic-decoding a bitstream of which coding efficiency is improved.

For example, in the selecting of the first context, the first context may be selected based on an information item about a reference position corresponding to a decoded three-dimensional point among the reference positions.

For example, the information item about the reference position corresponding to the decoded three-dimensional point may be a first information item corresponding to the reference position corresponding to the decoded three-dimensional point.

Accordingly, the three-dimensional data decoding method is capable of appropriately selecting a context based on the first information item corresponding to the reference position corresponding to the decoded three-dimensional point. Here, a value of the first information item has a high correlation with values of other first information items in a predetermined range in at least one of a temporal direction and a spatial direction. That is, there is a high possibility that, in the vicinity of the first information item, a first information item having the same value appears in the at least one of the temporal direction or the spatial direction. Therefore, by selecting a context, using a first information item corresponding to a reference position corresponding to a decoded three-dimensional point, a context can be used with consideration given to correlation. Thus, it may be possible to reduce an encoding amount.

For example, the information item about the positions of the three-dimensional points may express each of the positions using a distance component, a first direction component, and a second direction component.

Accordingly, in the three-dimensional data decoding method, an information item about a position that is expressed with the distance component, the first direction component, and the second direction component can be decoded from a bitstream of which coding efficiency is improved.

For example, each of the reference positions may contain the first direction component and the second direction component, and in the selecting of the first context, the first context may be selected based on an information item about a first reference position that corresponds to a decoded three-dimensional point and contains a first direction component having a same value as a first direction component contained in a second reference position corresponding to the first information item to be processed.

Accordingly, in the three-dimensional data decoding method, the first context can be selected appropriately by referring to an information item about a reference position that includes a first direction component having the same value as a first direction component included in a reference position to be processed. Here, in what is called polar coordinates, when values of first direction components are assumed to be the same, values of first information items have high correlations even when values of second direction components are different. Therefore, by selecting a context, referring to the information item about the reference position that includes the first direction component having the same value as the first direction component included in the reference position to be processed, a context can be used with consideration given to correlation. Thus, it may be possible to reduce an encoding amount.

For example, first information items corresponding to reference positions may be arithmetic-decoded in an order based on the first direction component in a processing unit composed of the first information items, the reference positions containing second direction components having a same value.

Accordingly, by arithmetic-decoding first information items in a determined order, it may be possible that the same value is more likely to appear in processed first information items compared with the case where the first information items are arithmetic-decoded in no particular order. Accordingly, it may be possible to reduce a code amount.

For example, the first direction component may be a vertical component, the second direction component may be a horizontal component, and the first information items may be arithmetic-decoded in the order based on the vertical component.

Accordingly, there is continuity in presence or absence of points to be processed in the vertical direction. It may be possible to reduce an encoding amount.

For example, each of the reference positions may contain the first direction component and the second direction component, and the first information item to be processed may indicate a first difference between a value of the first direction component of a three-dimensional point to be processed and a value of the first direction component contained in a first reference position corresponding to the three-dimensional point to be processed.

Accordingly, in the three-dimensional data decoding method, a bitstream of which coding efficiency is improved can be appropriately decoded.

For example, each of the reference positions may contain the first direction component and the second direction component, the first information item to be processed may indicate a third difference that is a difference between a first difference and a second difference, the first difference may be a difference between a value of the first direction component of the three-dimensional point to be processed and a value of the first direction component contained in a first reference position corresponding to the three-dimensional point to be processed, and the second difference may be a difference between a value of the first direction component of a decoded three-dimensional point and a value of the first direction component contained in a second reference position corresponding to the decoded three-dimensional point.

Accordingly, in the three-dimensional data decoding method, a bitstream of which coding efficiency is improved can be appropriately decoded.

For example, the reference positions may correspond to sampling positions in a sensor for generating the three-dimensional points.

For example, when intra prediction is applied to a three-dimensional point to be processed, the first context may be selected by a first method, and when inter prediction is applied to the three-dimensional point to be processed, the first context may be selected by a second method that is different from the first method.

Accordingly, in the three-dimensional data decoding method, a context appropriate to each of the intra prediction and the inter prediction can be selected. Thus, coding efficiency can be improved.

For example, in the second method, the first context may be selected by reference to a processed frame that is different from a frame to be processed that includes the three-dimensional point to be processed.

Accordingly, in the three-dimensional data decoding method, a context appropriate to the inter prediction can be selected. Thus, coding efficiency can be improved.

A three-dimensional data encoding device according to one aspect of the present disclosure includes a processor and memory. Using the memory, the processor determines, from among reference positions, a reference position corresponding to each of three-dimensional points; generates first information items each of which corresponds to a different one of the reference positions and indicates whether a three-dimensional point corresponding to a reference position corresponding to the first information item is present; selects, from among contexts, a first context for a first information item to be processed that is included in the first information items; and arithmetic-encodes the first information item to be processed, using the first context.

Accordingly, the three-dimensional data encoding device is capable of arithmetic-encoding a first information item on a target point, using the first context selected from among the contexts. Accordingly, for example, a context appropriate to each first information item can be used. Therefore, coding efficiency can be improved.

A three-dimensional data decoding device according to one aspect of the present disclosure includes a processor and memory. Using the memory, the processor selects, from among contexts, a first context for an encoded first information item to be processed; and arithmetic-decodes the encoded first information item to be processed, using the first context, to generate a first information item to be processed. Encoded first information items including the encoded first information item to be processed are included in a bitstream generated by encoding an information item about positions of three-dimensional points. The encoded first information items are generated by arithmetic-encoding first information items including the first information item to be processed. The first information items each correspond to a different one of reference positions and indicate whether a three-dimensional point corresponding to a reference position corresponding to the first information item is present.

Accordingly, the three-dimensional data decoding device is capable of arithmetic-decoding a first information item on a target point, using the first context selected from among the contexts. Accordingly, for example, a context appropriate to each first information item can be used. Therefore, the three-dimensional data decoding device is capable of appropriately arithmetic-decoding a bitstream of which coding efficiency is improved.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

Embodiment

First, a configuration of three-dimensional data encoding device 100 according to the present embodiment will be described. FIG. 1 is a block diagram of three-dimensional data encoding device 100 according to the present embodiment. Three-dimensional data encoding device 100 generates a bitstream (encoded stream) by encoding point cloud data being three-dimensional data.

The point cloud data includes position information items on three-dimensional points. The position information items indicate three-dimensional positions of the three-dimensional points. It should be noted that the position information items may be also referred to as geometry information items.

For example, the position information items are each expressed in a polar coordinate system and each include one distance component and two direction components (angle components). Specifically, the position information items each include distance d, elevation angle θ, and horizontal angle ϕ. The point cloud data is, for example, data obtained by a laser sensor such as LiDAR.

The point cloud data may include attribute information items (color, reflectivity, etc.) of the three-dimensional points in addition to the position information items. FIG. 1 illustrates a processor unit relating to encoding of the position information items on the point cloud data. However, three-dimensional data encoding device 100 may include another processor unit such as a processor unit that performs encoding and the like of the attribute information items.

Three-dimensional data encoding device 100 includes transformer 101, subtractor 102, quantizer 103, entropy encoder 104, inverse quantizer 105, adder 106, buffer 108, intra predictor 109, buffer 110, motion detector and compensator 111, inter predictor 112, and switcher 113.

Transformer 101 generates transform information items by transforming position information items included in point cloud data to be encoded that is input. Specifically, transformer 101 generates information for associating reference positions and three-dimensional points with each other. Transformer 101 also transforms position information items on the three-dimensional points, using the reference positions. For example, the transform information items include differences between the reference positions and the position information items on the three-dimensional points. This will be described later in detail. Transformer 101 may include a buffer for retaining the transformed position information items. In other words, transformer 101 is a calculator that calculates a value to be encoded.

Subtractor 102 generates residual signals (also referred to as prediction residuals) by subtracting predicted values from the transformed position information items. Quantizer 103 quantizes the residual signals. Entropy encoder 104 generates a bitstream by entropy encoding the quantized residual signals. Entropy encoder 104 also entropy encodes control information that is information and the like generated by transformer 101 and adds the encoded information to the bitstream.

Inverse quantizer 105 generates residual signals by inverse quantizing the quantized residual signals obtained by quantizer 103. Adder 106 reproduces transform information items by adding predicted values to the residual signals generated by inverse quantizer 105. Buffer 108 retains the reproduced transform information items as a reference point cloud for intra prediction. Buffer 110 retains the reproduced transform information items as a reference point cloud for inter prediction.

It should be noted that the reproduced transform information items each include a quantization error and thus may fail to perfectly match original transform information items. Three-dimensional points that are reproduced by an encoding process and a decoding process in this manner will be referred to as encoded three-dimensional points, decoded three-dimensional points, or processed three-dimensional points.

Intra predictor 109 calculates a predicted value, using transform information items on one or a plurality of reference points other than a three-dimensional point to be processed (hereinafter referred to as a target point), the reference points being processed three-dimensional points belonging to the same frame as a frame to which the target point belongs.

Motion detector and compensator 111 detects a displacement between a target frame being a frame including the target point and a reference frame being a frame different from the target frame (motion detection) and corrects transform information items on a point cloud included in the reference frame based on the detected displacement (motion compensation). Information indicating the detected displacement (motion information) is stored in, for example, the bitstream.

Inter predictor 112 calculates a predicted value, using transform information items on one or a plurality of reference points included in the point cloud that are subjected to the motion compensation. It should be noted that the motion detection and the motion compensation need not be performed.

Switcher 113 selects one of the predicted value calculated by intra predictor 109 and the predicted value calculated by inter predictor 112 and outputs the selected predicted value to subtractor 102 and adder 106. That is, switcher 113 switches whether to apply the intra prediction or the inter prediction. For example, switcher 113 calculates a cost value of the case where the intra prediction is applied and a cost value of the case where the inter prediction is applied and selects a prediction method that results in a smaller cost value. The cost value is, for example, a value based on a code amount after encoding. A smaller code amount results in a smaller cost value. In the case where the intra prediction and the inter prediction each have a plurality of techniques (a plurality of prediction modes), a prediction mode to be used is determined based on the cost value in the same manner. It should be noted that a method of determining the prediction method (the intra prediction or inter prediction) and the prediction mode is not limited to this. The prediction method and the prediction mode may be determined based on settings designated from the outside or properties of the point cloud data. Alternatively, selectable candidates of the prediction method and selectable candidates of the prediction mode may be narrowed down based on settings designated from the outside or properties of the point cloud data.

Three-dimensional data encoding device 100 may obtain position information items expressed in a Cartesian coordinate system, transform the position information items in the Cartesian coordinate system to position information items in a polar coordinate system, and perform the encoding process on the obtained position information items in the polar coordinate system. For example, three-dimensional data encoding device 100 may include a coordinate transformer performing the coordinate transformation process in a stage prior to transformer 101. In this case, three-dimensional data encoding device 100 may generate position information items in the polar coordinate system by performing, on the transform information items reproduced by adder 106, inverse transform of the transform process performed by transformer 101, transform the generated position information items in the polar coordinate system to position information items in the Cartesian coordinate system, calculate differences between the obtained position information items in the Cartesian coordinate system and original position information items in the Cartesian coordinate system being input, and store information indicating the calculated differences in a bitstream.

Figure 2:
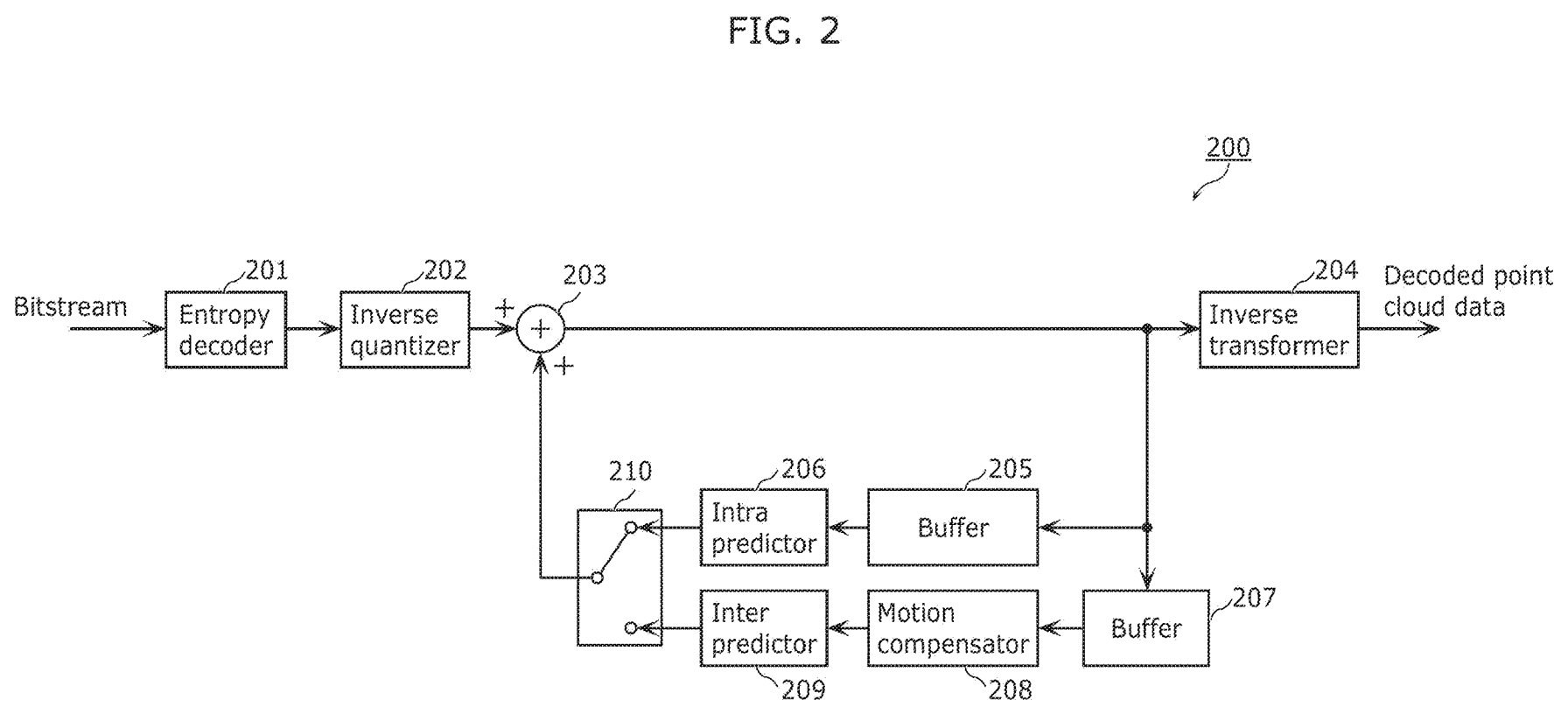

Next, a configuration of three-dimensional data decoding device 200 that decodes a bitstream generated by three-dimensional data encoding device 100 described above will be described. FIG. 2 is a block diagram of three-dimensional data decoding device 200 according to the present embodiment. FIG. 2 illustrates a processor unit relating to decoding of position information items on a point cloud. However, three-dimensional data decoding device 200 may include another processor unit such as a processor unit that performs decoding and the like of attribute information items on the point cloud. For example, three-dimensional data decoding device 200 generates decoded point cloud data by decoding a bitstream generated by three-dimensional data encoding device 100 illustrated in FIG. 1.

Three-dimensional data decoding device 200 includes entropy decoder 201, inverse quantizer 202, adder 203, inverse transformer 204, buffer 205, intra predictor 206, buffer 207, motion compensator 208, inter predictor 209, and switcher 210.

Three-dimensional data decoding device 200 obtains a bitstream generated by three-dimensional data encoding device 100.

Entropy decoder 201 entropy decodes the bitstream, thus generating quantized residual signals, control information, and the like.

Inverse quantizer 202 generates residual signals by inverse quantizing the quantized residual signals obtained by entropy decoder 201. Adder 203 reproduces transform information items by adding predicted values to the residual signals generated by inverse quantizer 202.

Inverse transformer 204 reproduces position information items by performing, on the transform information items, inverse transform of the transform process performed by transformer 101. Specifically, inverse transformer 204 obtains, from the bitstream, information for associating reference positions and three-dimensional points with each other and associates the reference positions and the three-dimensional points with each other based on the obtained information. Inverse transformer 204 also transforms position information items on the three-dimensional points, using the reference positions. For example, inverse transformer 204 calculates the position information items by adding the transform information items and the reference positions together. In other words, inverse transformer 204 is a calculator that calculates a position information item from a decoded value. The position information items are output as the decoded point cloud data.

Buffer 205 retains the transform information items reproduced by adder 203 as a reference point cloud for the intra prediction. Buffer 207 retains the transform information items reproduced by adder 203 as a reference point cloud for the inter prediction. Intra predictor 206 calculates a predicted value, using transform information items on one or a plurality of reference points other than a target point, the reference points being processed three-dimensional points belonging to the same frame as a frame to which the target point belongs.

Motion compensator 208 obtains, from the bitstream, motion information indicating a displacement between a target frame and a reference frame and corrects, based on the displacement indicated by the motion information, transform information items on a point cloud included in the reference frame (motion compensation). Inter predictor 209 calculates a predicted value, using transform information items on one or a plurality of reference points included in the point cloud that are subjected to the motion compensation. It should be noted that the motion compensation need not be performed.

Switcher 210 selects one of the predicted value calculated by intra predictor 206 and the predicted value calculated by inter predictor 209 and outputs the selected predicted value to adder 203. For example, switcher 210 obtains information indicating the prediction method (the intra prediction or the inter prediction) from the bitstream and determines a prediction method to be used based on the obtained information. In the case where the intra prediction and the inter prediction each have techniques (prediction modes), information indicating a prediction mode is obtained from a bitstream, and a prediction mode to be used is determined based on the obtained information, in the same manner.

Three-dimensional data decoding device 200 may transform decoded position information items expressed in the polar coordinate system to position information items expressed in the Cartesian coordinate system and output the position information items expressed in the Cartesian coordinate system. For example, three-dimensional data decoding device 200 may include a coordinate transformer performing the coordinate transformation process in a stage subsequent to inverse transformer 204. In this case, three-dimensional data decoding device 200 obtains, from the bitstream, information indicating differences between original position information items in the Cartesian coordinate system before being encoded and decoded and the decoded position information items in the Cartesian coordinate system. Three-dimensional data decoding device 200 may transform the position information items in the polar coordinate system reproduced by inverse transformer 204 to position information items in the Cartesian coordinate system, add the differences indicated by the information to the obtained position information items in the Cartesian coordinate system, and output the obtained position information items in the Cartesian coordinate system.

Next, operation of three-dimensional data encoding device 100 will be described. FIG. 3 is a diagram illustrating operation of transformer 101. FIG. 3 is a diagram illustrating an encoding order (processing order) of three-dimensional points (reference positions) in the encoding process.

In FIG. 3, a horizontal direction represents horizontal angle $\phi$ in polar coordinates, and a vertical direction represents elevation angle $\theta$ in the polar coordinates. Transformer 101 sets reference positions rm (m=0, 1, 2, . . . ) (also referred to as reference points). Here, reference positions rm are each expressed with horizontal angle $\phi$ and elevation angle $\theta$. In other words, reference positions rm are each expressed with two components ($\theta$, $\phi$) out of three components ($d$, $\theta$, $\phi$) that express a position information item on a three-dimensional point. In addition, in the example illustrated in FIG. 3, reference positions rm indicated by squares in the figure are set based on sampling interval $\Delta\phi$ that is a horizontal sampling interval of LiDAR and scan-line interval $\Delta\theta k$ of LiDAR (k=1, 2, 3). In other words, the reference positions are set based on combinations of predetermined horizontal angles and elevation angles and disposed on a plane expressed by horizontal angle $\phi$ and elevation angle $\theta$ in a matrix pattern. In the example illustrated in FIG. 3, intervals $\Delta\phi$ between horizontal angles $\phi j$ (j=0, 1, 2, . . . ) of the reference positions are constant. Intervals between elevation angles $\theta k$ (k=0, 1, 2, 3) of the reference positions can be set individually.

Transformer 101 performs an encoding process (a transform process) on points pn (n=0, 1, 2, . . . ) indicated by rhombi located in the vicinities of the reference positions in an order indicated by dashed arrows in the figure. Hatched squares indicate first reference positions where points referring to the reference positions are present, and squares not hatched indicate second reference positions where points referring to the reference positions are not present.

The points referring to the reference position are points based on the reference positions. The points are associated with the reference positions (encoded (transformed) using the reference positions) as will be described later. In addition, the points referring to the reference positions are each a point of which values of horizontal angle $\phi$ and elevation angle $\theta$ are included within their respective ranges including the corresponding reference position. For example, the points referring to the reference positions are points pn that have horizontal angles being greater than or equal to $\phi j$ and less than $\phi j+\Delta\phi$ and are on the same scan line (have the same elevation angle). The range in horizontal angle is not limited to this. The range in horizontal angle may be, for example, greater than or equal to $\phi j-\Delta\phi/2$ and less than $\phi j+\Delta\phi/2$.

The processing order (encoding order) illustrated in FIG. 3 is based on processing units (corresponding to columns in FIG. 3) each consisting of reference positions having horizontal angles of the same value (e.g., r0 to r3), and in each processing unit, the reference positions are processed (encoded) in an order based on the elevation angle (ascending order in FIG. 3). The processing units (corresponding to the columns in FIG. 3) are processed in an order based on the horizontal angle (ascending order in FIG. 3). In other words, the reference positions are processed in ascending order of elevation angle for each set of reference positions having horizontal angles of the same value. The reference positions may be processed in ascending order of horizontal angle for each set of reference positions having elevation angles of the same value.

In encoding (transforming) of a target point, transformer 101 generates information for identifying a position ($\phi j$, $\theta k$) of reference position rm that is referred to by target point pn. Transformer 101 generates an offset ($\phi_o n$, $\theta_o n$) from the reference position to the target point and information for identifying distance information dn on the target point. Here, $\phi_o n$ is a difference between horizontal angle $\phi j$ of the reference position and a horizontal angle of the target point, and $\theta_o n$ is a difference between elevation angle $\theta k$ of the reference position and an elevation angle of the target point.

The information for identifying the position of the reference position that is referred to by the target point, offset ($\phi_o n$, $\theta_o n$) from the reference position to the target point, and the information for identifying distance information dn on the target point each may be information for identifying a difference value from a predicted value generated based on processed information or may be information for identifying the value itself.

Three-dimensional data encoding device 100 may also store sampling interval $\Delta\phi$ that is a horizontal sampling interval of LiDAR and scan-line interval $\Delta\theta k$ of LiDAR in a bitstream. For example, the three-dimensional data encoding device may store $\Delta\phi$ and $\Delta\theta k$ in a header of an SPS or a GPS. Accordingly, three-dimensional data decoding device 200 can set the reference positions, using $\Delta\phi$ and $\Delta\theta k$.

Here, the SPS (sequence parameter set) is a sequence-based parameter set (control information) where a sequence includes frames. The SPS is also a parameter set common to geometry information and attribute information. The GPS (geometry parameter set) is a frame-based parameter set. The GPS is a parameter set for geometry information.

The transformer 101 may also transform sampling interval $\Delta\phi$ being a horizontal sampling interval of LiDAR and scan-line interval $\Delta\theta k$ of LiDAR to values that are rounded to integer values having a predetermined bit width, and store the transformed values in a bitstream. The example illustrated in FIG. 3 is an example in which the number of scan lines (the number of elevation angles) is 4 but can be carried out in the case where another number of scan lines such as 16, 64, or 128 is used.

Next, syntax of the geometry information will be described. FIG. 4 is a diagram illustrating an example of syntax of a geometry information item on each point. In syntax examples shown in FIG. 4 and FIG. 5, parameters (signals) stored in a bitstream are written in bold type. Three-dimensional data encoding device 100 repeatedly applies this syntax for each reference position rm to generate column_pos, which indicates an index of horizontal angle $\phi j$ of reference position rm serving as a reference for point pn to be processed next, and row_pos, which indicates an index of elevation angle $\theta k$ of reference position rm, and further generates parameter relating to point pn.

In this example, three-dimensional data encoding device 100 initializes variables before processing a first point. Specifically, three-dimensional data encoding device 100 sets first_point_in_column, which indicates a first piece of syntax corresponding to horizontal angles $\phi j$, to 1, sets column_pos to 0, and sets row_pos to 0. Alternatively, three-dimensional data encoding device 100 may notify three-dimensional data decoding device 200 of a value of column_pos and a value of row_pos of the first point, in advance of syntax corresponding to the first point. In this case, three-dimensional data encoding device 100 and three-dimensional data decoding device 200 may apply this syntax, using these values after setting first_point_in_column to 0.

Next, three-dimensional data encoding device 100 generates next_column_flag at reference position rm corresponding to a position having an elevation angle being $\theta 0$ (i.e., in the case where first_point_in_column is 1). next_column_flag indicates whether there is one or more points based on horizontal angles $\phi j$ corresponding to the position of reference position rm. In other words, next_column_flag indicates whether there is a point that refers to any one of reference positions having the same horizontal angle as horizontal angles $\phi j$ of reference position rm. For example, in the case where there is one or more points based on horizontal angle $\phi j$ corresponding to the position of reference position rm (e.g., horizontal angles $\phi 0$, $\phi 1$, $\phi 2$, and $\phi 4$ illustrated in FIG. 3), next_column_flag is set to 0, and in the case where there is no point based on horizontal angle $\phi j$ corresponding to the position of reference position rm (e.g., horizontal angle $\phi 3$ illustrated in FIG. 3), next_column_flag is set to 1. next_column_flag is provided for each horizontal angle $\phi j$ (for each column in FIG. 3).

By repeatedly generating next_column_flag until next_column_flag becomes 0, three-dimensional data encoding device 100 can generate information that enables identification of horizontal angle $\phi j$ corresponding to point pn to be processed next ($\phi 0+\text{column\_pos}\times\Delta\phi$). Accordingly, it may be possible to reduce a code amount required to notify next_row_flag described below.

Whether to notify next_column_flag can be determined by whether row_pos is 0, as will be shown in FIG. 5 described later. However, determination with first_point_in_column enables avoidance with the notification of next_column_flag, which is also unnecessary in the case where there are points at a position of row_pos being 0, and thus can reduce the code amount.

Three-dimensional data encoding device 100 generates next_row_flag at each candidate position of reference position rm serving as a reference for point pn to be processed next. next_row_flag indicates whether there is point pn to be processed at a position of elevation angle $\theta k$. In other words, next_row_flag indicates whether there is a point that refers to reference position rm. For example, when there is point pn to be processed at a position of elevation angle $\theta k$, next_row_flag is set to 0 (e.g., r0 and r1 in FIG. 3), and when there is no point pn to be processed at a position of elevation angle $\theta k$ (e.g., r2 and r3 in FIG. 3), next_row_flag is set to 1. next_row_flag is provided for each reference position.

When next_row_flag is 1, three-dimensional data encoding device 100 repeatedly applies the syntax illustrated in FIG. 4 to generate next_row_flag corresponding to each candidate position consecutively. By repeating this process until next_row_flag becomes 0, three-dimensional data encoding device 100 can generate information that enables identification of elevation angle θk corresponding to point pn to be processed next. For example, elevation angle θk corresponding to point pn to be processed next is given by (Expression 1) shown below.

[Math. 1]

$$\theta 0+\sum_{k=0}^{row\_pos}\Delta\theta k, \text{ but } \Delta\theta 0=0 \quad \text{(Expression 1)}$$

When row_pos reaches the number of scan lines (num_rows illustrated in FIG. 4), the process proceeds to next horizontal angle ϕj. At this time, three-dimensional data encoding device 100 sets row_pos to 0, increases column_pos by 1, and sets first_point_in_column to 1.

In the above-described manner, three-dimensional data encoding device 100 can generate the information items (next_column_flag and next_row_flag) that enable the identification of horizontal angle ϕj and elevation angle θk of reference position rm serving as the reference for point pn to be processed.

Subsequently, three-dimensional data encoding device 100 generates information relating to a distance of target point pn, information relating to an offset in horizontal angle from reference position rm to target point pn, and pred_mode, which is information relating to a prediction method for these parameters. Here, the information relating to the distance is, for example, residual residual_radius, which indicates a difference between the distance of the target point and a predicted value generated by a predetermined method. The information relating to the offset in horizontal angle is, for example, residual residual_phi, which indicates a difference between offset $\phi_o n$ in horizontal angle and a predicted value generated by a predetermined method.

The predicted values are calculated based on, for example, information on a processed three-dimensional point. For example, the predicted values are at least some of parameters of one or more processed three-dimensional points located in the vicinity of the target point. In this example, three-dimensional data encoding device 100 omits generation of information relating to an offset in elevation angle assuming that an offset in elevation angle is always 0. However, three-dimensional data encoding device 100 may generate information relating to an offset in elevation angle from reference position rm to point pn to be processed and store the information in a bitstream. For example, the information relating to an offset in elevation angle is residual residual_theta, which indicates a difference between offset bon of an elevation angle and a predicted value generated by a predetermined method.

Three-dimensional data encoding device 100 may transform position information items in a Cartesian coordinate system being input to position information items expressed in a polar coordinate system, and perform the encoding process on the obtained position information items expressed in the polar coordinate system. In this case, three-dimensional data encoding device 100 may transform again position information items in the polar coordinate system encoded and decoded (e.g., position information items generated by inverse transforming signals output from adder 106 illustrated in FIG. 1) to position information items in the Cartesian coordinate system, calculate differences between the obtained position information items in the Cartesian coordinate system and original position information items in the Cartesian coordinate system being input, and store information indicating the differences in a bitstream. The information indicating the differences includes, for example, correction values residual_x, residual_y, and residual_z on X, Y, and Z axes, respectively. In other words, in the case where the transform between the coordinate systems is not performed, residual_x, residual_y, and residual_z need not be included in the bitstream.

next_column_flag, next_row_flag, pred_mode, residual_radius, residual_phi, residual_theta, residual_x, residual_y, and residual_z generated in the above-described manner are stored in a bitstream and sent to three-dimensional data decoding device 200. It should be noted that all or some of these signals may be entropy encoded (arithmetic-encoded) by entropy encoder 104 before being stored in the bitstream.

As described above, three-dimensional data encoding device 100 can determine values of syntax elements for each candidate position for reference position rm by using the information items for identifying horizontal angle ϕj and elevation angle θk of reference position rm serving as the reference for point pn to be processed next and the flags (next_column_flag and next_row_flag) associated with each candidate position. In addition, it may be possible to make the encoding process, the decoding process, a data send process, or the like less delayed.

It should be noted that application of values to the syntax including next_column_flag, next_row_flag, and the like as well as the variables such as first_point_in_column in the description is merely an example. For example, the application may be changed such that 0 and 1 are inversely applied. This case can be carried out by conforming related conditional determinations and the like.

Next, another example of the syntax will be described. FIG. 5 is a diagram illustrating an example of the syntax of a geometry information item on each point. Three-dimensional data encoding device 100 repeatedly applies this syntax for each reference position rm to generate column_pos, which indicates an index of horizontal angle ϕj of reference position rm serving as a reference for point pn to be processed next, and row_pos, which indicates an index of elevation angle θk of reference position rm, and further generates parameter relating to point pn. The example shown in FIG. 5 differs from the example shown in FIG. 4 in the method of generating next_row_flag and next_column_flag used for identifying the values of column_pos and row_pos.

In this example, three-dimensional data encoding device 100 first initializes variables before applying the syntax to a first point. Specifically, three-dimensional data encoding device 100 notifies three-dimensional data decoding device 200 of a value of column_pos and a value of row_pos of the first point, in advance of syntax corresponding to the first point. In other words, for example, three-dimensional data encoding device 100 stores the value of column_pos and the value of row_pos of the first point in a bitstream. Three-dimensional data encoding device 100 and three-dimensional data decoding device 200 apply the syntax with these values.

Next, three-dimensional data encoding device 100 generates next_row_flag for reference position rm at a position indicated by next_row_flag and next_column_flag and notifies three-dimensional data decoding device 200 whether there is point pn based on reference position rm at the position.

When next_row_flag is 1, three-dimensional data encoding device 100 first increases row_pos by 1. Next, three-dimensional data encoding device 100 determines whether row_pos has reached the number of scan lines (num_rows shown in FIG. 5). When row_pos reaches the number of scan lines, three-dimensional data encoding device 100 sets row_pos to 0 and increases column_pos by 1, determining that a candidate position is to be shifted to next horizontal angle $\phi j$. Next, three-dimensional data encoding device 100 determines whether row_pos is 0. When row_pos is 0, three-dimensional data encoding device 100 generates one or more next_column_flag and repeatedly increases column_pos by 1 until next_column_flag becomes 0. Thereafter, three-dimensional data encoding device 100 repeatedly applies the syntax shown in FIG. 5 until next_row_flag becomes 0.

When next_row_flag is 0, three-dimensional data encoding device 100 determines the values indicated by next_row_flag and next_column_flag at the time to be an index of horizontal angle $\phi j$ and an index of elevation angle $\theta k$ of reference position rm serving as a reference for point pn to be processed next and stores parameters relating to point pn to be processed next (e.g., pred_mode, residual_radius, residual_phi, residual_x, residual_y, and residual_z shown in FIG. 5) in a bitstream as in the example shown in FIG. 4. Horizontal angle $\phi j$ can be calculated by $\phi 0+\text{column\_pos}\times\Delta\phi$, using values of the indices and sampling interval $\Delta\phi$ that is a horizontal sampling interval of LiDAR. Elevation angle $\theta k$ can be calculated by (Expression 1) shown above, using the values of the indices and scan-line interval $\Delta\theta k$ of LiDAR.

In the case where the transform between the coordinate systems is not performed, residual_x, residual_y, and residual_z need not be included in the bitstream. residual_theta may be included in the bitstream.

In the above-described manner, the notification of next_column_flag can be limited only to the case where row_pos=0 and next_row_flag=1, and thus it may be possible to reduce a code amount.

As described above, three-dimensional data encoding device 100 can determine values of syntax elements for each candidate position for reference position rm by using the information items for identifying horizontal angle $\phi j$ and elevation angle $\theta k$ of reference position rm serving as the reference for point pn to be processed next and the flags (next_column_flag and next_row_flag) associated with each candidate position. In addition, it may be possible to make the encoding process, the decoding process, a data send process, or the like less delayed.

It should be noted that application of values to the syntax including next_column_flag, next_row_flag, and the like in the description is merely an example. For example, the application may be changed such that 0 and 1 are inversely applied. This case can be carried out by conforming related conditional determinations and the like.

Figure 6:
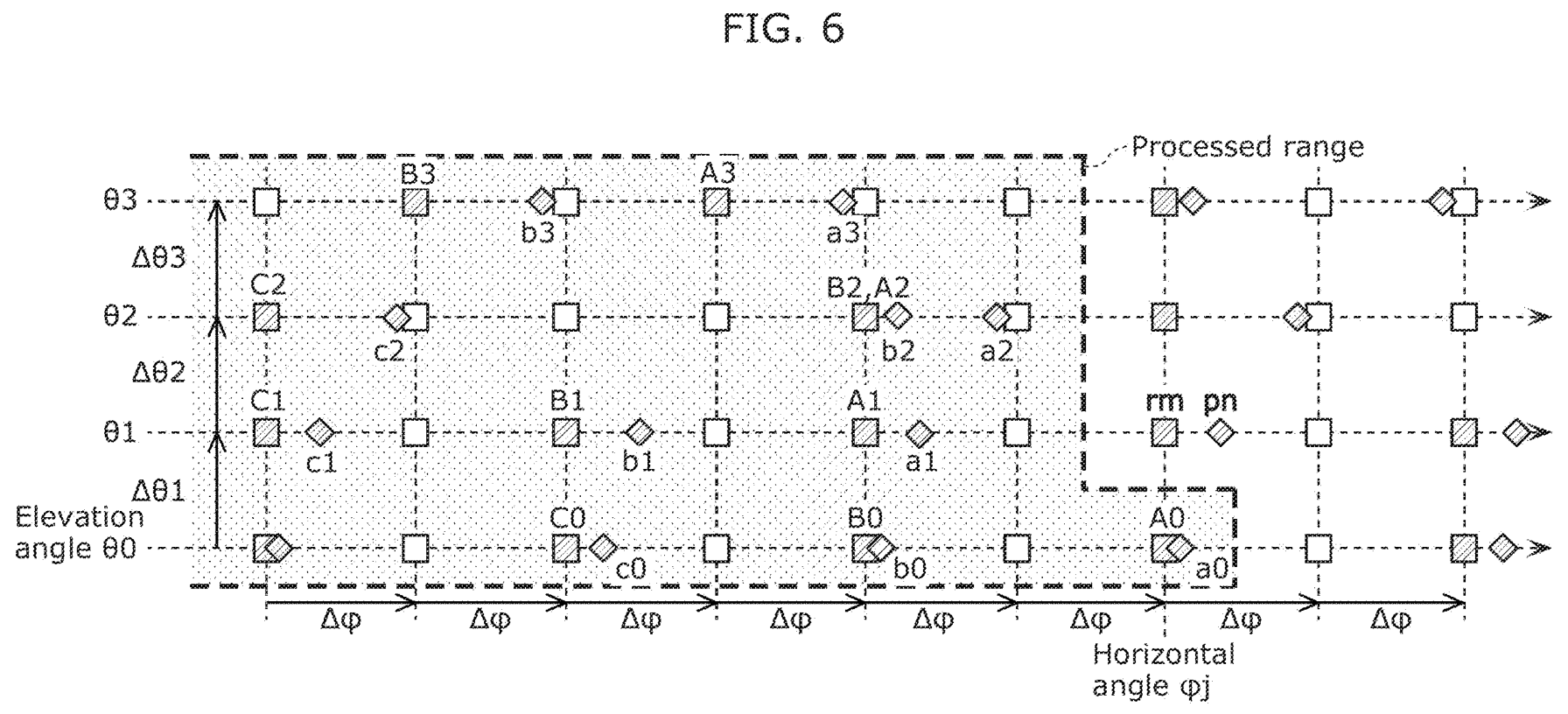

Next, an arithmetic encoding process of next_row_flag will be described. FIG. 6 is a diagram for describing an example of a method for selecting a context (a probability table) in arithmetic encoding of next_row_flag. Reference position rm indicated in FIG. 6 is a reference position corresponding to next_row_flag to be encoded.

Entropy encoder 104 can use information items about reference positions included in a processed range indicated by shading surrounded by broken lines in FIG. 6 for the encoding process on next_row_flag corresponding to reference position rm. For example, entropy encoder 104 retains, in a memory, a predetermined number of one or more first reference positions at which points that are processed recently at each scan line and refer to the reference positions (e.g., hatched squares such as reference positions A0, B0, and C0 on a scan line of elevation angle $\theta 0$). Based on one or more information items about the one or more first reference positions retained in the memory, entropy encoder 104 switches among contexts used for arithmetic encoding of next_row_flag.

For example, entropy encoder 104 uses an information item about at least one of reference positions A1, B1, and C1 that are located on the same scan line as reference position rm. Specifically, entropy encoder 104 may use a difference in column_pos between at least one of reference positions A1, B1, and C1 and reference position rm. For example, entropy encoder 104 may use a difference in column_pos between reference position A1 closest to reference position rm and reference position rm. Alternatively, entropy encoder 104 may use a combination of the difference in column_pos between reference position A1 being closest to reference position rm and reference position rm and a difference in column_pos between reference position B1 being next closest to reference position rm and reference position rm. In this manner, entropy encoder 104 may determine a context in accordance with whether one or more reference positions located on the same scan line as reference position rm are first reference positions (whether there are one or more points referring to the one or more reference positions). Here, in point cloud data obtained by LiDAR, for example, points located on the same scan line may have a high correlation. Therefore, by referring to information on the points located on the same scan line to select a context, the selection of a context can be performed appropriately.

Alternatively, entropy encoder 104 may use an information item about a first reference position that is processed most recently (e.g., reference position A0). Specifically, entropy encoder 104 may switch among contexts in accordance with the number of times next_row_flag is 1 consecutively from reference position A0 to reference position rm. Alternatively, entropy encoder 104 may switch among contexts in accordance with row_pos of reference position rm itself rather than the information items about reference positions retained in the memory.

Switching among contexts is selecting a context to be used from among a plurality of contexts. Each of the contexts may be a context having a fixed probability or may be a context having an updatable probability. For the context having an updatable probability, the probability is updated in accordance with a value (0, 1) of an arithmetic-encoded signal, and in a subsequent arithmetic encoding process using the same context, the updated probability is used.

As described above, entropy encoder 104 selects a context (a probability table) to be used in arithmetic encoding of next_row_flag using information items about processed reference positions. Accordingly, the contexts can be switched to one another finely, and it may be possible to improve coding efficiency.

Next, a method for intra prediction of information on a distance and a horizontal angle will be described with reference to FIG. 6. An example of a method for predicting the information relating to the distance of target point pn and the information relating to the horizontal angle of target point pn will be described below. Here, reference position rm indicated in FIG. 6 is a reference position that is referred to by target point pn. The intra prediction is a process of encoding a target point included in a target frame with reference to a reference point that is an encoded point different from the target point and included in the target frame. Specifically, one or more reference points are used to generate a predicted value, and a difference (residual) between information on the target point and the predicted value is calculated.

In an intra prediction process of target point pn, intra predictor 109 can use information items about reference positions and points within the processed range indicated by shading surrounded by the broken lines in the figure. For example, intra predictor 109 retains, in a memory, a predetermined number of information items on points that are processed most recently on each scan line (e.g., hatched rhombi such as points a1, b1, and c1 on a scan line of elevation angle θ1). Intra predictor 109 may predict information on target point pn based on the information items about the points retained in the memory. More specifically, intra predictor 109 retains, in the memory, information relating to distances and horizontal angles of points a1, b1, and c1 located on the same scan line as target point pn. Intra predictor 109 determines a prediction mode to be used and calculates a predicted value, using the determined prediction mode. Intra predictor 109 stores pred_mode indicating the determined prediction mode in a bitstream.

Specifically, intra predictor 109 uses a distance of a reference point as a predicted value of the distance of target point pn. Intra predictor 109 calculates a difference (residual component) between the predicted value and the distance of target point pn as residual_radius of target point pn. Intra predictor 109 uses a horizontal angle of the reference point as a predicted value of the horizontal angle of target point pn. Intra predictor 109 may calculate a difference between the predicted value and the horizontal angle of target point pn and calculate a remainder of division of the calculated difference by Δϕ as residual_phi of target point pn. That is, intra predictor 109 may calculate a difference between offset $\phi_o n$ in horizontal angle from reference position rm to target point pn and an offset in horizontal angle from a reference position (e.g., A1) of the reference point to the reference point (e.g., a1) as residual_phi of target point pn.

In the above-described example, the number of points retained for each scan line is three. The number may be any number that is common to three-dimensional data encoding device 100 and three-dimensional data decoding device 200. The intra prediction can be carried out when the number is one. In the case where the number is one, notification of pred_mode may be omitted. Intra predictor 109 may retain an offset in horizontal angle from the reference position to a processed point as information on a horizontal angle of the point and use the offset as the predicted value. In this case, intra predictor 109 may calculate a difference between the offset of target point pn in horizontal angle and the offset of the reference point in horizontal angle as residual_phi.

As described above, intra predictor 109 can reduce values of residual_radius and residual_phi by predicting the information relating to the distance of target point pn and the information relating to the horizontal angle of target point pn, using the information items about the reference positions or the points within the processed range. Therefore, it may be possible to improve coding efficiency.

Next, another example of a method for selecting a context in the arithmetic encoding process of next_row_flag will be described. Hereinafter, an example of a method for selecting a context to be used in arithmetic encoding of next_row_flag while referring to information on a reference frame that is an encoded frame different from a target frame including a target point. FIG. 7 is a diagram for describing the selection of the context. FIG. 7 is a diagram illustrating an example of the reference frame.

For example, when the target frame is an inter-encoded frame for which inter-encoding is used, entropy encoder 104 selects the context for next_row_flag by the following method.

It should be noted that a frame is point cloud data that expresses a certain three-dimensional space (an object) at a certain time point. The reference frame typically is point cloud data that indicates the same three-dimensional space as the target frame at a time point different from a time point of the target frame. The reference frame need not necessarily be different in time point from the target frame. The reference frame may be point cloud data that expresses a three-dimensional space different from the target frame at the same time point as the time point of the target frame.

FIG. 7 illustrates an example of a reference frame of the case of arithmetic encoding of next_row_flag corresponding to reference position rm that target point pn included in the target frame illustrated in FIG. 6 refers to. Entropy encoder 104 selects a context to be used in arithmetic encoding of next_row_flag, using an information item about reference position Col indicated in FIG. 7. For example, reference position Col is a reference position that is the closest to reference position rm of reference positions included in the reference frame. It should be noted that a method for selecting reference position Col is not limited to this. Any technique that enables both three-dimensional data encoding device 100 and three-dimensional data decoding device 200 to select reference position Col uniquely may be used.

For example, reference position Col may be a reference position that is on a scan line having the same row_pos as reference position rm and has the same column_pos as reference position rm, out of the reference positions included in the reference frame. In other words, reference position Col may be a reference position that has the same values of row_pos and column_pos as values of row_pos and column_pos of reference position rm.

FIG. 7 illustrates an example in which there is one point referring to reference position Col. However, there may be no point referring to reference position Col, or there may be points referring to reference position Col. The case where there is no point referring to reference position Col is the case where there is one next_row_flag corresponding to reference position Col, and where a value of next_row_flag is 1. The case there are points referring to reference position Col is the case where there are a plurality of next_row_flags corresponding to reference position Col and having a value of 0. In this case also, reference position Col is determined in the above-described manner.

When the target frame is the inter-encoded frame, entropy encoder 104 may further apply selection of a context using reference position Col in addition to the selection of a context using the information items about reference positions in the target frame, which is described with reference to FIG. 6. In other words, entropy encoder 104 may select a context, using both the information items about encoded reference positions in the target frame and an information item about reference position Col.

Specifically, as a method for selecting a context using reference position Col, entropy encoder 104 may select a context to be used in arithmetic encoding of next_row_flag corresponding to reference position rm in accordance with whether at least one or more next_row_flag corresponding to reference position Col is 0.

Alternatively, entropy encoder 104 may select a context using information items about reference positions included in region A that includes reference position Col and the vicinity of reference position Col. For example, for each of reference positions included in region A (9 reference positions in FIG. 7), entropy encoder 104 may determine whether at least one of next_row_flag corresponding to the reference position is 0 and may select a context based on a result of the determination. Specifically, entropy encoder 104 may select a context in accordance with whether the number of reference positions included in the reference positions included in region A and satisfying the condition described above is larger or smaller than the number of reference positions included in the reference positions included in region A and not satisfying the condition. For example, when the number of the reference positions satisfying the condition is larger than the number of the reference positions not satisfying the condition, entropy encoder 104 selects context 0, and when the number of the reference positions satisfying the condition is smaller than the number of the reference positions not satisfying the condition, entropy encoder 104 selects context 1. In the example illustrated in FIG. 7, the number of the reference positions satisfying the condition is 3, and the number of the reference positions not satisfying the condition is 6. Therefore, the number of the reference positions satisfying the condition is determined to be smaller than the number of the reference positions not satisfying the condition.

Alternatively, entropy encoder 104 may select a context in accordance with the number (a total sum) of the reference positions satisfying the condition. For example, entropy encoder 104 may select a context in accordance with a value of the number of the reference positions satisfying the condition from among 10 contexts including context 0 to context 9 corresponding to 0 to 9 that are numbers of the reference positions satisfying the condition. It should be noted that the value of the number of the reference positions and the contexts need not be associated in a one-to-one correspondence. One context may be associated with values of numbers of the reference positions.

A shape of region A illustrated in FIG. 7 is an example. A range of region A is not limited to this. For example, region A may be a range having the same row_pos as reference position Col. For example, region A may include reference position Col illustrated in FIG. 7 and reference positions on the right and left sides of reference position Col, three reference positions in total. Alternatively, region A may be a range having the same column_pos as reference position Col. For example, region A may include reference position Col illustrated in FIG. 7 and reference positions on the upper and lower sides of reference position Col, three reference positions in total. Alternatively, region A may include reference position Col illustrated in FIG. 7 and reference positions on the upper, lower, right and left sides of reference position Col, five reference positions in total.

Entropy encoder 104 may switch between the method for selecting a context in which an information item about reference position Col is referred to and the method for selecting a context in which information items about encoded reference positions in the target frame are referred to described with reference to FIG. 6 in accordance with whether the target frame is an inter-encoded frame or an intra-encoded frame for which intra-encoding is used. That is, when the target frame is an inter-encoded frame, entropy encoder 104 may use the method for selecting a context in which an information item about reference position Col is referred to, and when the target frame is an intra-encoded frame, entropy encoder 104 may use the method for selecting a context in which information items about encoded reference positions in the target frame are referred to. The switching need not be performed only on a per frame basis.

The switching may be performed, for example, on a per reference position basis or on a per set of reference positions basis. In this case, for example, three-dimensional data encoding device 100 generates, on such a basis, a flag that indicates which of the intra prediction and the inter prediction is to be applied, and stores the flag in a bitstream. Three-dimensional data decoding device 200 may refer to the flag and switch, on such a basis, between the method for selecting a context in which an information item about reference position Col is referred to and the method for selecting a context in which information items about encoded reference positions in the target frame are referred to.

As described above, by selecting a context to be used in arithmetic encoding of next_row_flag, using information items about reference positions in a processed frame, three-dimensional data encoding device 100 can switch among contexts more finely. Accordingly, it may be possible to further improve coding efficiency.

Next, a method for inter prediction of a distance and a horizontal angle will be described. The inter prediction is a process of encoding a target point included in a target frame with reference to a reference frame that is an encoded frame different from the target frame. Specifically, one or more encoded reference points included in the reference frame are used to generate a predicted value, and a difference (residual) between information on the target point and the predicted value is calculated. The reference frame typically is point cloud data that indicates the same three-dimensional space as the target frame at a time point different from a time point of the target frame. The reference frame need not necessarily be different in time point from the target frame. The reference frame may be point cloud data that expresses a three-dimensional space different from the target frame at the same time point as the time point of the target frame.

Figure 8:
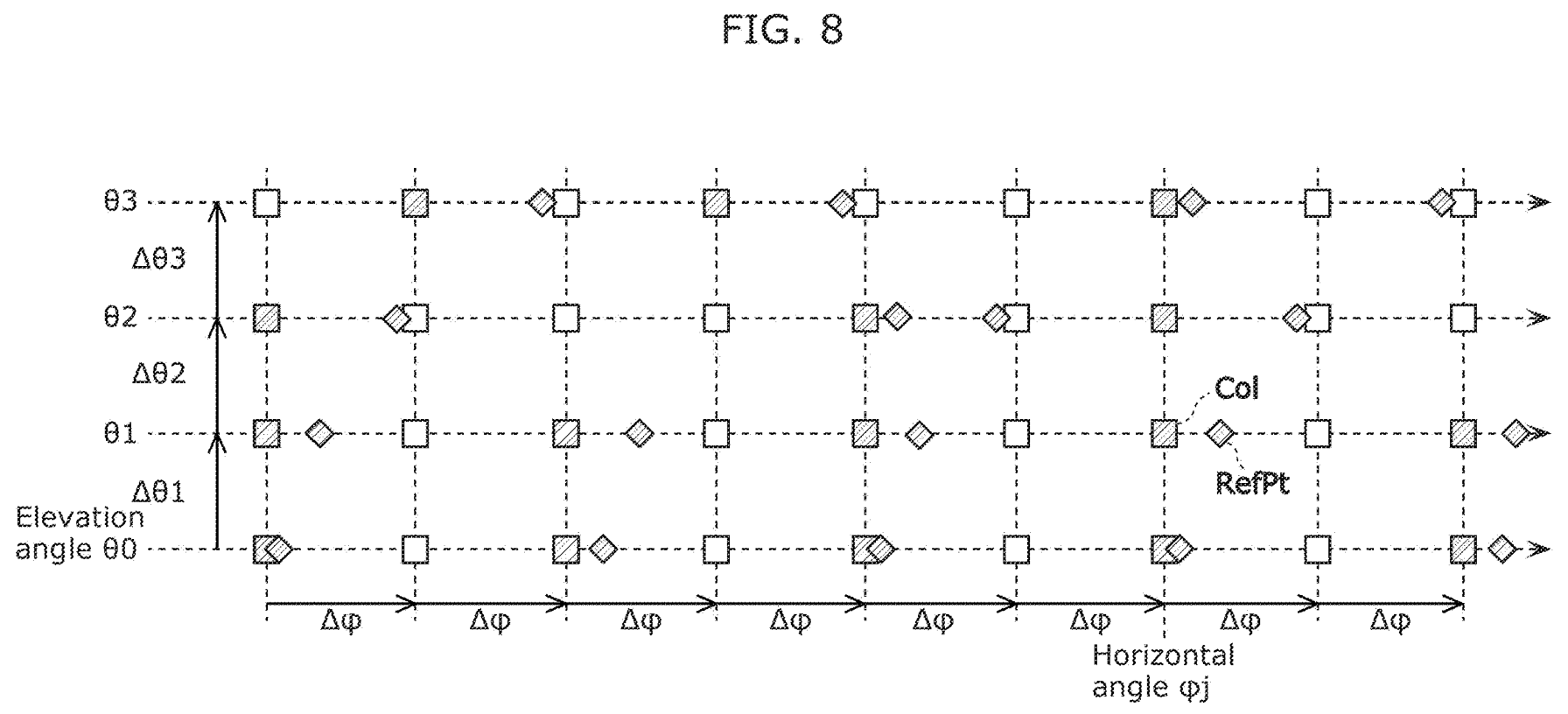

FIG. 8 is a diagram for describing an example of the method for inter prediction that predicts information relating to a distance of target point pn and information relating to a horizontal angle of target point pn. FIG. 8 is a diagram illustrating an example of the reference frame. FIG. 8 also illustrates an example of a reference frame for target point pn included in the target frame illustrated in FIG. 6.

When a frame to be encoded is an inter-encoded frame, inter predictor 112 calculates a predicted value of the information relating to the distance of target point pn and a predicted value of the information relating to the horizontal angle of target point pn, using information on the reference frame. For example, inter predictor 112 calculates the predicted values, using information on reference point RefPt included in the reference frame illustrated in FIG. 8.

For example, reference point RefPt is a point that is the closest in position to reference position rm of points included in the reference frame. Alternatively, reference point RefPt is a point associated with a reference position that is the closest in position to reference position rm of reference positions included in the reference frame. It should be noted that a method for determining reference point RefPt may be a method that enables both three-dimensional data encoding device 100 and three-dimensional data decoding device 200 to select reference point RefPt uniquely.

For example, inter predictor 112 selects a reference position that is on a scan line having the same row_pos as reference position rm and has the same column_pos as reference position rm, from among the reference positions included in the reference frame. In the case where there is one point that refers to such a reference position as in the example illustrated in FIG. 8, inter predictor 112 determines the point as reference point RefPt. In the case where there are points that refer to such a reference position, inter predictor 112 may determine a point closest to the reference position as reference point RefPt. In the case there is no point that refers to such a reference position, inter predictor 112 may determine, as reference point RefPt, a point that is the closest to the reference position of points on a scan line having the same row_pos as the reference position. Alternatively, inter predictor 112 need not perform the inter prediction for the information on target point pn, determining that there is no point to be referred to.

Referring to the information on reference point RefPt, inter predictor 112 calculates the predicted values of the distance and the horizontal angle. For example, inter predictor 112 uses a distance of reference point RefPt as a predicted value and calculates a difference (residual component) between the distance of target point pn and the predicted value as residual_radius of target point pn.

Inter predictor 112 also uses a horizontal angle of reference point RefPt as a predicted value and calculates a difference between the horizontal angle of target point pn and the predicted value. Furthermore, inter predictor 112 may calculate a remainder of division of the calculated difference by $\Delta\phi$ as residual_phi of target point pn.

Inter predictor 112 may use an offset in horizontal angle from reference position Col to reference point RefPt as a predicted value and calculate a difference between the predicted value and offset $\phi_o n$ in horizontal angle from reference position rm to target point pn as residual_phi.

Three-dimensional data encoding device 100 may selectively use the method for inter prediction and the method for intra prediction described with reference to FIG. 6. For example, three-dimensional data encoding device 100 stores mode information that indicates whether to use the inter prediction in syntax information corresponding to point pn included in a bitstream. According to the mode information, three-dimensional data decoding device 200 can switch between the method for intra prediction illustrated in FIG. 6 and the method for inter prediction.

When the target frame is an intra-encoded frame, three-dimensional data encoding device 100 may omit storing the mode information. In addition, the inter prediction may be assigned to one of prediction modes indicated by pred_mode. In this case, three-dimensional data decoding device 200 can switch between the method for intra prediction and the method for inter prediction according to pred_mode.

As described above, three-dimensional data encoding device 100 can further reduce the value of residual_radius and the value of residual_phi by predicting the information relating to the distance of target point pn and the information relating to the horizontal angle of target point pn, using the information items about points in a processed frame. Therefore, it may be possible to improve coding efficiency.

Figure 9:
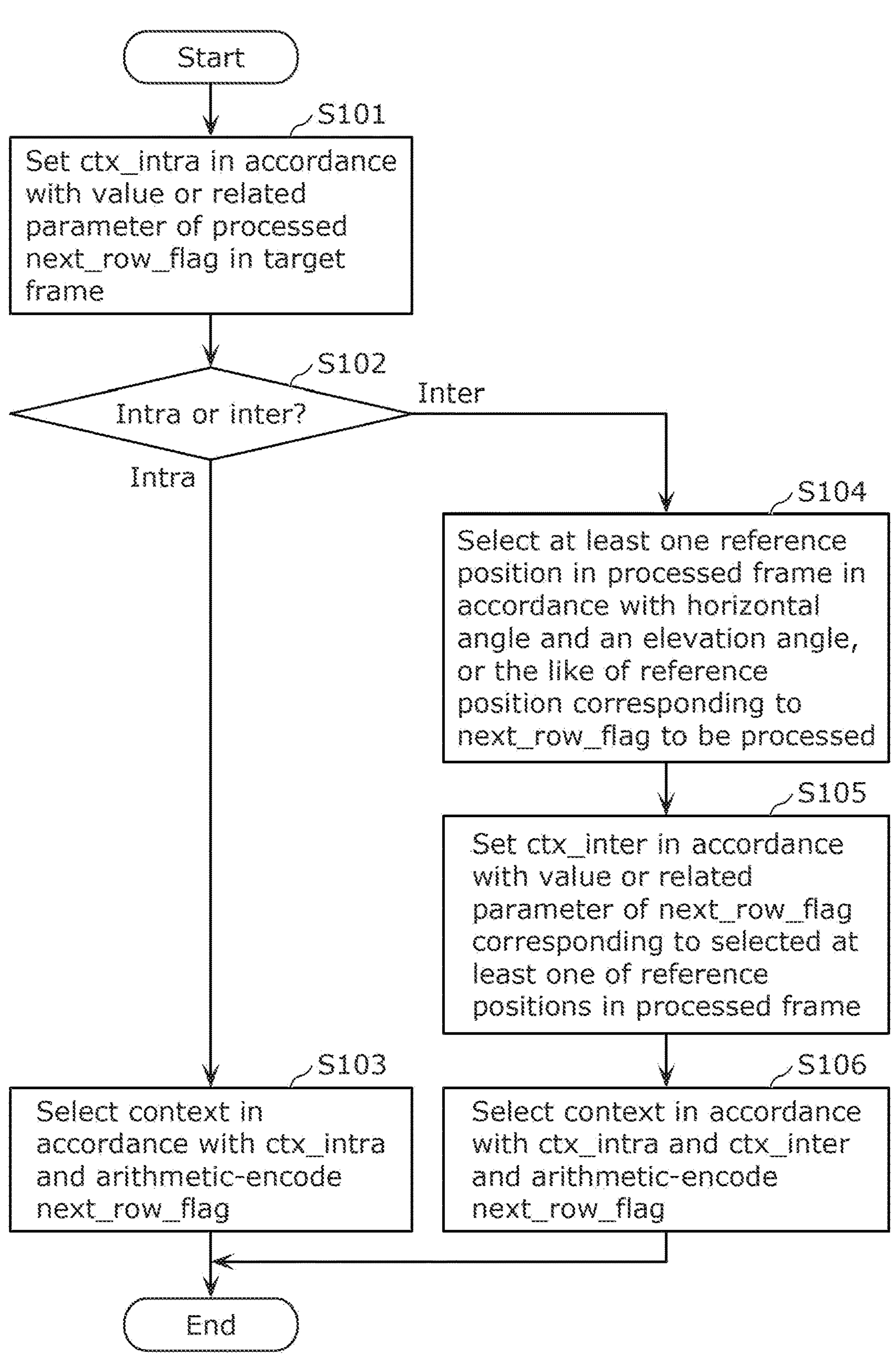
FIG. 9 is a flowchart of an arithmetic encoding process according to the embodiment.

Next, a flow of the arithmetic encoding process of next_row_flag will be described. FIG. 9 is a flowchart illustrating an example of a procedure of the arithmetic encoding process of next_row_flag.

First, entropy encoder 104 sets ctx_intra in accordance with a value or a related parameter of processed next_row_flag in the target frame, using the method described with reference to FIG. 6, for example (S101). ctx_intra is information for designating a context to be used in the arithmetic encoding of next_row_flag. The related parameter is, for example, row_pos or column_pos of a reference position corresponding to such next_row_flag.

Next, entropy encoder 104 determines whether an encoding mode (a decoding mode) used in encoding of a reference position or a three-dimensional point corresponding to next_row_flag to be processed is an intra mode in which the intra prediction is used or an inter mode in which the inter prediction is used (S102). Which of the intra mode and the inter mode is used is determined by, for example, three-dimensional data encoding device 100, and information indicating the determined encoding mode is stored in a bitstream. Referring to the information, three-dimensional data decoding device 200 determines the encoding mode used in encoding of the reference position or the three-dimensional point corresponding to next_row_flag to be processed.

When the intra mode is used (Intra in S102), entropy encoder 104 selects a context in accordance with ctx_intra and performs the arithmetic encoding of next_row_flag, using the selected context (S103).

On the other hand, when the inter mode is used (Inter in S102), entropy encoder 104 first selects at least one (one or a plurality of) reference position in a processed frame by the method described with reference to FIG. 7 or the like in accordance with a horizontal angle and an elevation angle (or row_pos and column_pos), or the like of a reference position corresponding to next_row_flag to be processed (S104).

Next, entropy encoder 104 sets ctx_inter that is information for designating a context to be used in the arithmetic encoding of next_row_flag in accordance with the value of next_row_flag corresponding to the selected at least one of reference positions in the processed frame or the related parameter of such next_row_flag (e.g., row_pos or/and column_pos of the reference position corresponding to such next_row_flag) (S105).

Next, entropy encoder 104 selects a context in accordance with ctx_intra and ctx_inter and performs the arithmetic encoding of next_row_flag, using the selected context (S106).

It should be noted that ctx_intra and ctx_inter may be information items of which the number of combinations does not exceed the number of contexts and each of which can designate a context uniquely. For example, ctx_intra and ctx_inter are each expressed with an integer being greater than or equal to 0.

From FIG. 9, a context is selected using both ctx_intra and ctx_inter when the inter mode is used. However, a context may be selected using only ctx_inter.

As described above, entropy encoder 104 can select a context in the arithmetic-encoding in accordance with whether an encoding mode for the reference position corresponding to next_row_flag to be processed is the intra mode or the inter mode. Accordingly, it may be possible to further improve coding efficiency of an inter-encoded frame.

Three-dimensional data encoding device 100 may store information that gives instructions about whether to forbid (permit) switching among contexts with reference to information on a processed frame in a frame header of a target frame or a header higher than the frame header. When the information gives the instructions about the forbiddance, three-dimensional data encoding device 100 need not use ctx_inter even when an encoding mode of a reference position corresponding to next_row_flag to be processed is the inter mode and may select a context in accordance with ctx_intra and perform the arithmetic encoding of next_row_flag, using the selected context. Accordingly, it is possible to eliminate dependency on frames in arithmetic encoding and to select an encoding independently for each frame. Therefore, it may be possible to improve error tolerance and improve concurrency in processing.

Three-dimensional data encoding device 100 may store information for identifying a processed frame on which information is referred to when contexts are switched to one another in a frame header of a target frame or a header higher than the frame header. For example, the information is an index value applied to an individual processed frame. Alternatively, three-dimensional data encoding device 100 may refer to a processed frame identified for prediction in the inter mode or may identify a processed frame to be referred to by a predetermined method (e.g., selecting a processed frame closest in time or distance).

It should be noted that an arithmetic decoding process by entropy decoder 201 included in three-dimensional data decoding device 200 is similar to the arithmetic encoding process by entropy encoder 104 included in three-dimensional data encoding device 100 and corresponds to the arithmetic encoding described above in which the arithmetic encoding is replaced with arithmetic decoding.

Figure 10:
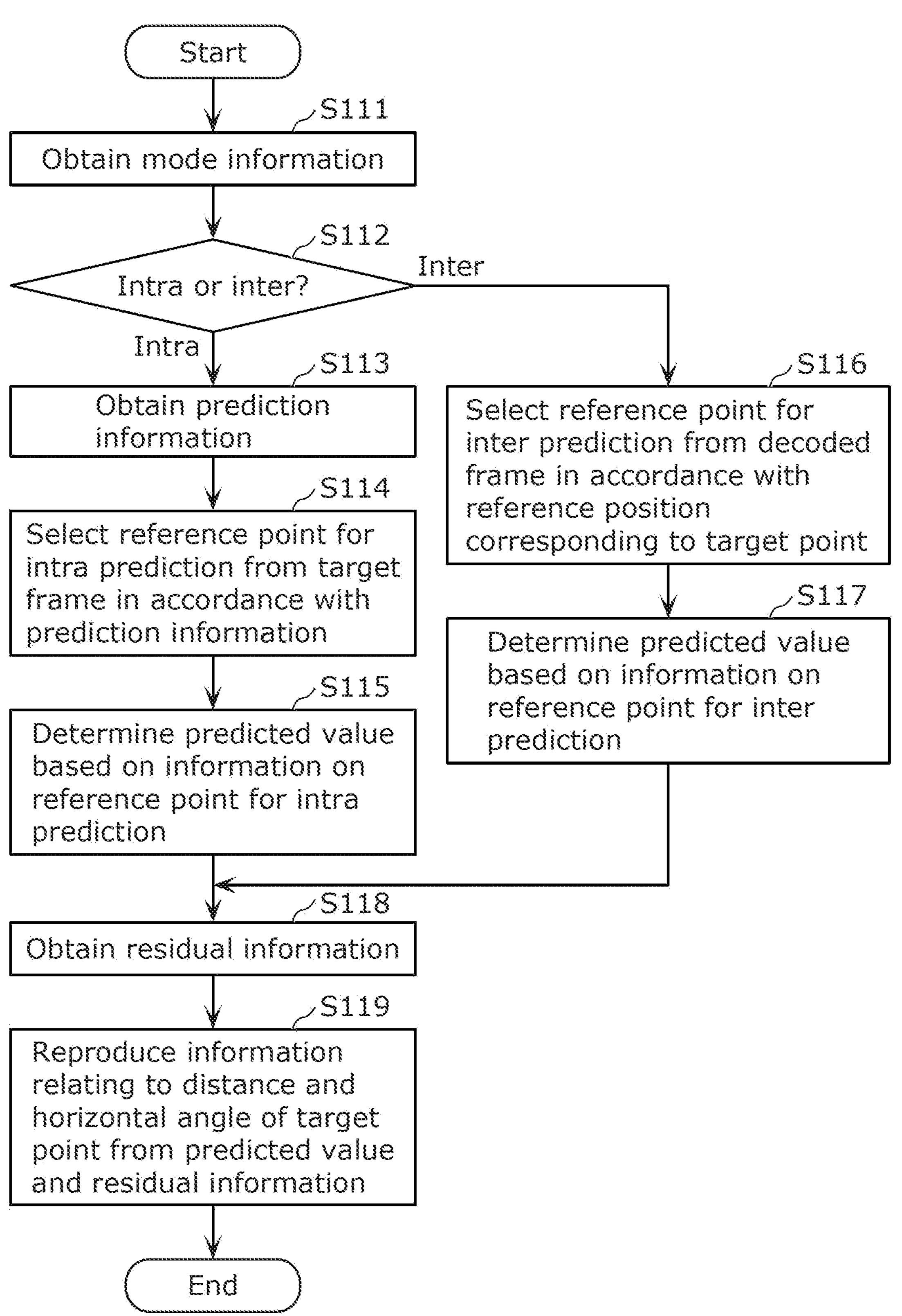
FIG. 10 is a flowchart of a decoding process of position information according to the embodiment.

A flow of a decoding process of position information in three-dimensional data decoding device 200 will be described. FIG. 10 is a flowchart of the decoding process of position information by three-dimensional data decoding device 200. Three-dimensional data decoding device 200 first obtains, from a bitstream, mode information indicating whether to use the inter prediction (S111). Next, three-dimensional data decoding device 200 determines whether a decoding mode of a target point is the intra mode or the inter mode in accordance with the decoded mode information (S112).

When the intra mode is used (Intra in S112), three-dimensional data decoding device 200 obtains prediction information (e.g., pred_mode shown in FIG. 4) from the bitstream (S113). Next, in accordance with the obtained prediction information, three-dimensional data decoding device 200 performs the method for intra prediction described with reference to FIG. 6. Specifically, three-dimensional data decoding device 200 selects one or more processed points in a target frame as one or more reference points for the intra prediction (S114). Three-dimensional data decoding device 200 determines a predicted value, using the selected one or more reference points for the intra prediction (S115). Specifically, three-dimensional data decoding device 200 determines the predicted value, using information relating to one or more horizontal angles and distances of the selected one or more reference points, and the like.

On the other hand, when the inter mode is used (Inter in S112), three-dimensional data decoding device 200 determines a predicted value by performing the method for inter prediction described with reference to FIG. 8. Specifically, three-dimensional data decoding device 200 selects one or more points in a decoded frame as one or more reference points for the inter prediction in accordance with a reference position corresponding to the target point (S116). Next, three-dimensional data decoding device 200 determines the predicted value, using the selected one or more reference points for the inter prediction (S117). Specifically, three-dimensional data decoding device 200 determines the predicted value, using information relating to one or more horizontal angles and distances of the selected one or more reference points, and the like.

After step S115 or S117, three-dimensional data decoding device 200 obtains residual information (e.g., residual_radius and residual_phi) from the bitstream (S118). Next, three-dimensional data decoding device 200 reproduces information relating to a distance and a horizontal angle of the target point from the residual information and the predicted value that is determined in step S115 or S117 (S119).

When the target frame is an intra-encoded frame, three-dimensional data decoding device 200 may omit the determination as to whether the decoding mode is the intra mode or the inter mode and may always perform the intra prediction (the process of step S113 and subsequent steps). In addition, the inter prediction may be assigned to one of values indicated by pred_mode. In this case, three-dimensional data decoding device 200 may decode pred_mode before the determination as to whether the decoding mode is the intra mode or the inter mode and determine whether the decoding mode is the intra mode or the inter mode based on decoded pred_mode.

In the encoding process, three-dimensional data encoding device 100 performs a prediction process according to a procedure corresponding to the processing procedure illustrated in FIG. 10. For example, three-dimensional data encoding device 100 performs both the intra prediction and the inter prediction, derives residual information items based on predicted values calculated in the intra prediction and the inter prediction, selects, from between the intra prediction and the inter prediction, a prediction method that gives a smaller code amount necessary for encoding the corresponding residual information item, and generates mode information, prediction information, and the residual information item in accordance with a result of the selection. In addition, three-dimensional data encoding device 100 generates a bitstream including the mode information, the prediction information, and the residual information item. The three-dimensional data encoding device 100 may store the prediction information in the bitstream only when the mode information is the intra mode.

As described above, three-dimensional data encoding device 100 can further reduce the value of residual_radius and the value of residual_phi by predicting the information relating to the distance of the target point and the information relating to the horizontal angle of the target point while switching between the intra prediction and the method for inter prediction. Therefore, it may be possible to improve coding efficiency.

Three-dimensional data encoding device 100 may store, in a frame header of the target frame or the like, information for identifying a processed frame on which information is referred to when the inter prediction is performed (e.g., an index value applied to an individual processed frame). Alternatively, three-dimensional data encoding device 100 and three-dimensional data decoding device 200 may identify a processed frame to be referred to by a predetermined method. For example, three-dimensional data encoding device 100 and three-dimensional data decoding device 200 may select, as the reference frame, a processed frame that is closest to the target frame in time or distance.

Figure 11:
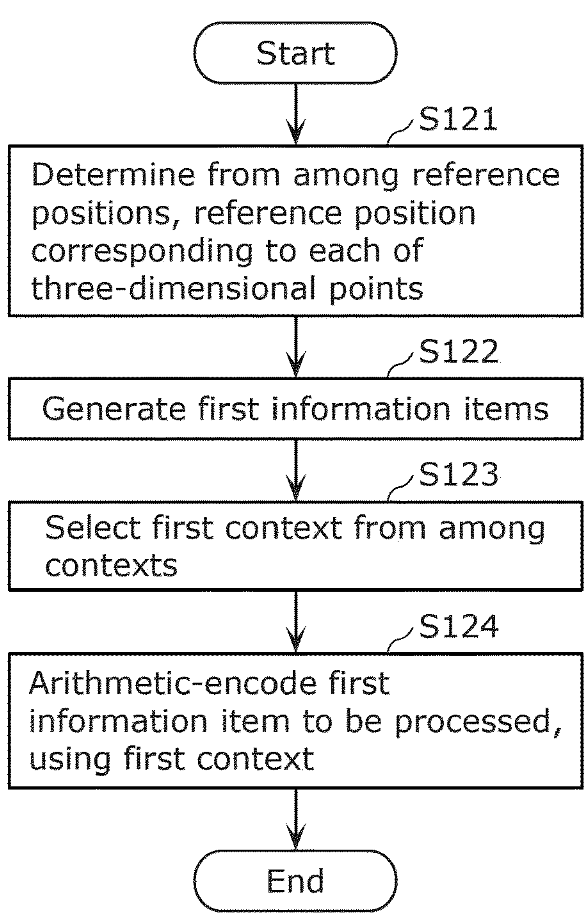
FIG. 11 is a flowchart of a three-dimensional data encoding process according to the embodiment.

As stated above, the three-dimensional data encoding device according to the present embodiment performs the process shown in FIG. 11. The three-dimensional data encoding device determines, from among reference positions, a reference position corresponding to each of three-dimensional points (S121). The three-dimensional data encoding device generates first information items (e.g., next_row_flag or next_column_flag) each of which corresponds to a different one of the reference positions and indicates whether a three-dimensional point corresponding to a reference position corresponding to the first information item is present (S122). For example, the first information corresponds to at least one of the syntaxes shown in FIG. 4 or FIG. 5. The three-dimensional data encoding device selects, from among contexts, a first context for a first information item to be processed that is included in the first information items (S123), and arithmetic-encodes the first information item to be processed, using the first context (S124).

Accordingly, the three-dimensional data encoding device makes it possible to arithmetic-encode a first information item on a target point, using the first context selected from among the contexts. Accordingly, for example, a context appropriate to each first information item can be used. Therefore, coding efficiency can be improved.

For example, in the selecting of the first context (S123), the three-dimensional data encoding device selects the first context based on an information item (e.g., at least one of next_row_flag, next_column_flag, row_pos, or column_pos) about a reference position corresponding to an encoded three-dimensional point among the reference positions. Accordingly, the three-dimensional data encoding device makes it possible to appropriately select a context based on the information item about the reference position corresponding to the encoded three-dimensional point.

For example, the information item about the reference position corresponding to the encoded three-dimensional point is a first information item corresponding to the reference position corresponding to the encoded three-dimensional point. Accordingly, the three-dimensional data encoding device makes it possible to appropriately select a context based on the first information item corresponding to the reference position corresponding to the encoded three-dimensional point. Here, a value of the first information item has a high correlation with values of other first information items in a predetermined range in at least one of a temporal direction and a spatial direction. That is, there is a high possibility that, in the vicinity of the first information item, a first information item having the same value appears in the at least one of the temporal direction or the spatial direction. Therefore, by selecting a context, using a first information item corresponding to a reference position corresponding to an encoded three-dimensional point, a context can be used with consideration given to correlation. Thus, it may be possible to reduce an encoding amount.

For example, an information item about positions of the three-dimensional points expresses each of the positions using a distance component, a first direction component, and a second direction component (e.g., a distance, an elevation angle, and a horizontal angle). Accordingly, the three-dimensional data encoding device makes it possible to improve coding efficiency in encoding an information item about a position that is expressed with the distance component, the first direction component, and the second direction component. For example, each of the positions is expressed in a polar coordinate system.

For example, each of the reference positions contains the first direction component (e.g., an elevation angle) and the second direction component (e.g., a horizontal angle). In the selecting of the first context (S123), the three-dimensional data encoding device selects the first context based on an information item about a first reference position that corresponds to an encoded three-dimensional point and contains a first direction component having a same value as a first direction component contained in a second reference position corresponding to the first information item to be processed.

Accordingly, the three-dimensional data encoding device makes it possible to select the first context appropriately by referring to an information item about a reference position that includes a first direction component having the same value as a first direction component included in a reference position to be processed. For example, like position information items etc. of three-dimensional points obtained by LiDAR, there is a possibility of improving coding efficiency when a correlation between position information items having the same value of the first direction component (e.g., an elevation angle) is high.

For example, the three-dimensional data encoding device arithmetic-encodes information items corresponding to reference positions in an order based on the first direction component in a processing unit composed of the first information items, the reference positions containing second direction components having a same value. For example, a coding order as shown in FIG. 3 is used.

Accordingly, when a reference position preceding the reference position to be processed in a coding order differs from the reference position to be processed in the value of the first direction component, the three-dimensional data encoding device makes it possible to select the first context appropriately by referring to an information item about a reference position that includes a first direction component having the same value as a first direction component included in the reference position to be processed.

For example, the first direction component is a vertical component, the second direction component is a horizontal component, and the first information items are arithmetic-encoded in the order based on the vertical component. Accordingly, there is continuity in presence or absence of points to be processed in the vertical direction. It may be possible to reduce an encoding amount in arithmetic encoding.

For example, each of the reference positions contains the first direction component and the second direction component. The three-dimensional data encoding device further calculates a first difference between a value of the first direction component of a three-dimensional point to be processed and a value of the first direction component contained in a first reference position corresponding to the three-dimensional point to be processed. Additionally, the three-dimensional data encoding device may calculate a difference between a value of the second direction component of the three-dimensional point to be processed and a value of the second direction component contained in the first reference position.

Accordingly, the three-dimensional data encoding device makes it possible to improve coding efficiency by calculating the first difference between the value of the first direction component of the three-dimensional point to be processed and the value of the first direction component of the first reference position.

For example, the three-dimensional data encoding device further calculates a second difference between a value of the first direction component of an encoded three-dimensional point and a value of the first direction component contained in a second reference position corresponding to the encoded three-dimensional point, and calculates a third difference that is a difference between the first difference and the second difference. Accordingly, the three-dimensional data encoding device makes it possible to further improve coding efficiency.

For example, the reference positions correspond to sampling positions in a sensor for generating the three-dimensional points. It should be noted that the reference positions are not limited to this example, and may correspond to, for example, predetermined positions or positions spaced apart at a predetermined distance.

For example, when the three-dimensional data encoding device applies intra prediction to a three-dimensional point to be processed, the three-dimensional data encoding device selects the first context by a first method; and when the three-dimensional data encoding device applies inter prediction to the three-dimensional point to be processed, the three-dimensional data encoding device selects the first context by a second method that is different from the first method. Accordingly, the three-dimensional data encoding device makes it possible to select a context appropriate to each of the intra prediction and the inter prediction. Thus, the three-dimensional data encoding device makes it possible to improve coding efficiency.

For example, in the second method, the first context is selected by reference to a processed frame that is different from a frame to be processed that includes the three-dimensional point to be processed. Accordingly, the three-dimensional data encoding device makes it possible to select a context appropriate to the inter prediction. Thus, the three-dimensional data encoding device makes it possible to improve coding efficiency. For example, the three-dimensional data encoding device includes a processor and memory. Using the memory, the processor performs the above process.

Figure 12:
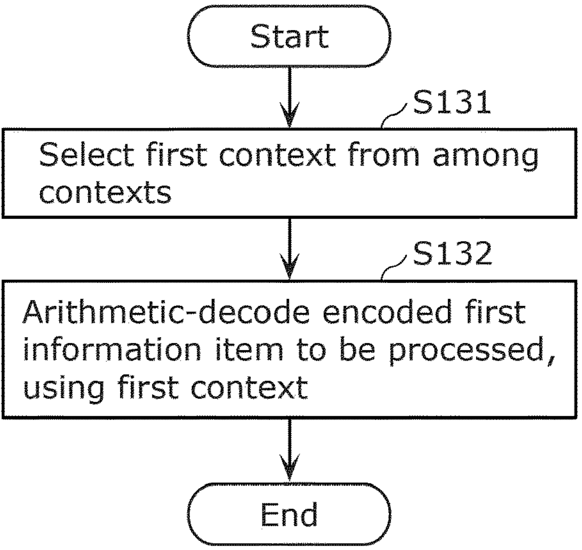
FIG. 12 is a flowchart of a three-dimensional data decoding process according to the embodiment.

The three-dimensional data decoding device according to the present embodiment performs the process shown in FIG. 12. The three-dimensional data decoding device selects, from among contexts, a first context for an encoded first information item to be processed (S131), and arithmetic-decodes the encoded first information item to be processed, using the first context, to generate a first information item to be processed (S132). Here, encoded first information items including the encoded first information item to be processed are included in a bitstream generated by encoding an information item about positions of three-dimensional points. The encoded first information items are generated by arithmetic-encoding first information items including the first information item to be processed. The first information items each correspond to a different one of reference positions and indicate whether a three-dimensional point corresponding to a reference position corresponding to the first information item is present. For example, the three-dimensional data decoding device may further determine whether the three-dimensional point corresponding to the reference position corresponding to the first information item to be processed, using the first information item to be processed.

Accordingly, the three-dimensional data decoding device makes it possible to arithmetic-decode a first information item on a target point, using the first context selected from among the contexts. Accordingly, for example, a context appropriate to each first information item can be used. Therefore, the three-dimensional data decoding device makes it possible to appropriately arithmetic-decode a bitstream of which coding efficiency is improved.

For example, in the selecting of the first context (S131), the three-dimensional data decoding device selects the first context based on an information item about a reference position (e.g., at least one of next_row_flag, next_column_flag, row_pos, or column_pos) corresponding to a decoded three-dimensional point among the reference positions. Accordingly, the three-dimensional data decoding device makes it possible to appropriately select a context based on the information item about the reference position corresponding to the decoded three-dimensional point.

For example, the information item about the reference position corresponding to the decoded three-dimensional point is a first information item corresponding to the reference position corresponding to the decoded three-dimensional point. Accordingly, the three-dimensional data decoding device makes it possible to appropriately select a context based on the first information item corresponding to the reference position corresponding to the decoded three-dimensional point. Here, a value of the first information item has a high correlation with values of other first information items in a predetermined range in at least one of a temporal direction and a spatial direction. That is, there is a high possibility that, in the vicinity of the first information item, a first information item having the same value appears in the at least one of the temporal direction or the spatial direction. Therefore, by selecting a context, using a first information item corresponding to a reference position corresponding to a decoded three-dimensional point, a context can be used with consideration given to correlation. Thus, it may be possible to reduce an encoding amount.

For example, the information item about the positions of the three-dimensional points expresses each of the positions using a distance component, a first direction component, and a second direction component (e.g., a distance, an elevation angle, and a horizontal angle). Accordingly, the three-dimensional data decoding device makes it possible to decode an information item about a position that is expressed with the distance component, the first direction component, and the second direction component, from a bitstream of which coding efficiency is improved. For example, each of the positions is expressed in a polar coordinate system.

For example, each of the reference positions contains the first direction component (e.g., an elevation angle) and the second direction component (e.g., a horizontal angle). In the selecting of the first context (S131), the three-dimensional data decoding device selects the first context based on an information item about a first reference position that corresponds to a decoded three-dimensional point and contains a first direction component having a same value as a first direction component contained in a second reference position corresponding to the first information item to be processed.

Accordingly, the three-dimensional data decoding device makes it possible to select the first context appropriately by referring to an information item about a reference position that includes a first direction component having the same value as a first direction component included in a reference position to be processed.

For example, the three-dimensional data decoding device arithmetic-decodes first information items corresponding to reference positions in an order based on the first direction component in a processing unit composed of the first information items, the reference positions containing second direction components having a same value. For example, the three-dimensional data decoding device calculates an information item about positions of three-dimensional points, using reference positions and first information items generated by arithmetic-decoding encoded first information items.

Accordingly, when a reference position preceding the reference position to be processed in a coding order differs from the reference position to be processed in the value of the first direction component, the three-dimensional data decoding device makes it possible to select the first context appropriately by referring to an information item about a reference position that includes a first direction component having the same value as a first direction component included in the reference position to be processed.

For example, the first direction component is a vertical component, the second direction component is a horizontal component, and the first information items are arithmetic-decoded in the order based on the vertical component. Accordingly, there is continuity in presence or absence of points to be processed in the vertical direction. It may be possible to reduce an encoding amount.

For example, each of the reference positions contains the first direction component and the second direction component, and the first information item to be processed indicates a first difference between a value of the first direction component of a three-dimensional point to be processed and a value of the first direction component contained in a first reference position corresponding to the three-dimensional point to be processed. Accordingly, the three-dimensional data decoding device makes it possible to appropriately decode a bitstream of which coding efficiency is improved.

For example, each of the reference positions contains the first direction component and the second direction component, the first information item to be processed indicates a third difference that is a difference between a first difference and a second difference, the first difference is a difference between a value of the first direction component of the three-dimensional point to be processed and a value of the first direction component contained in a first reference position corresponding to the three-dimensional point to be processed, and the second difference is a difference between a value of the first direction component of a decoded three-dimensional point and a value of the first direction component contained in a second reference position corresponding to the decoded three-dimensional point. Accordingly, the three-dimensional data decoding device makes it possible to appropriately decode a bitstream of which coding efficiency is improved.

For example, the reference positions correspond to sampling positions in a sensor for generating the three-dimensional points. It should be noted that the reference positions are not limited to this example, and may correspond to, for example, predetermined positions or positions spaced apart at a predetermined distance.

For example, when the three-dimensional data decoding device applies intra prediction to a three-dimensional point to be processed, the three-dimensional data decoding device selects the first context by a first method; and when the three-dimensional data decoding device applies inter prediction to the three-dimensional point to be processed, the three-dimensional data decoding device selects the first context by a second method that is different from the first method. Accordingly, the three-dimensional data decoding device makes it possible to select a context appropriate to each of the intra prediction and the inter prediction. Thus, the three-dimensional data decoding device makes it possible to improve coding efficiency.

For example, in the second method, the first context is selected by reference to a processed frame that is different from a frame to be processed that includes the three-dimensional point to be processed. Accordingly, the three-dimensional data decoding device makes it possible to select a context appropriate to the inter prediction. Thus, the three-dimensional data decoding device makes it possible to improve coding efficiency.

For example, the three-dimensional data decoding device includes a processor and memory. Using the memory, the processor performs the above process.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

The invention claimed is:

1. A three-dimensional data decoding method comprising:

selecting, from among contexts, a first context for an encoded first information item to be processed; and arithmetic-decoding the encoded first information item to be processed, using the first context, to generate a first information item to be processed, wherein encoded first information items including the encoded first information item to be processed are included in a bitstream generated by encoding an information item about positions of three-dimensional points, the encoded first information items are generated by arithmetic-encoding first information items including the first information item to be processed, each of the three-dimensional points is assigned to one of a plurality of reference positions, each of the reference positions contains a first direction component and a second direction component, each of the reference positions is a reference position to which no three-dimensional point is assigned or a reference position to which one or more three-dimensional points are assigned, and the first information items each correspond to a different one of the reference positions and indicate whether a three-dimensional point assigned to a reference position corresponding to the first information item is present.

2. The three-dimensional data decoding method according to claim 1, wherein in the selecting of the first context, the first context is selected based on an information item about a reference position corresponding to a decoded three-dimensional point among the reference positions.

3. The three-dimensional data decoding method according to claim 2, wherein the information item about the reference position corresponding to the decoded three-dimensional point is a first information item corresponding to the reference position corresponding to the decoded three-dimensional point.

4. The three-dimensional data decoding method according to claim 1, wherein the information item about the positions of the three-dimensional points expresses each of the positions using a distance component, the first direction component, and the second direction component.

5. The three-dimensional data decoding method according to claim 4, wherein in the selecting of the first context, the first context is selected based on an information item about a first reference position that corresponds to a decoded three-dimensional point and contains a first direction component having a same value as a first direction component contained in a second reference position corresponding to the first information item to be processed.

6. The three-dimensional data decoding method according to claim 5, wherein first information items corresponding to reference positions are arithmetic-decoded in an order based on the first direction component in a processing unit composed of the first information items, the reference positions containing second direction components having a same value.

7. The three-dimensional data decoding method according to claim 6, wherein the first direction component is a vertical component, the second direction component is a horizontal component, and the first information items are arithmetic-decoded in the order based on the vertical component.

8. The three-dimensional data decoding method according to claim 4, wherein the first information item to be processed indicates a first difference between a value of the first direction component of a three-dimensional point to be processed and a value of the first direction component contained in a first reference position corresponding to the three-dimensional point to be processed.

9. The three-dimensional data decoding method according to claim 4, wherein the first information item to be processed indicates a third difference that is a difference between a first difference and a second difference, the first difference is a difference between a value of the first direction component of the three-dimensional point to be processed and a value of the first direction component contained in a first reference position corresponding to the three-dimensional point to be processed, and the second difference is a difference between a value of the first direction component of a decoded three-dimensional point and a value of the first direction component contained in a second reference position corresponding to the decoded three-dimensional point.

10. The three-dimensional data decoding method according to claim 1, wherein the reference positions correspond to sampling positions in a sensor for generating the three-dimensional points.

11. The three-dimensional data decoding method according to claim 1, wherein when intra prediction is applied to a three-dimensional point to be processed, the first context is selected by a first method, and when inter prediction is applied to the three-dimensional point to be processed, the first context is selected by a second method that is different from the first method.

12. The three-dimensional data decoding method according to claim 11, wherein in the second method, the first context is selected by reference to a processed frame that is different from a frame to be processed that includes the three-dimensional point to be processed.

13. A three-dimensional data encoding device comprising:

a processor; and memory, wherein using the memory, the processor:

determines, from among reference positions, a reference position corresponding to each of a plurality of three-dimensional points, wherein each of the three-dimensional points is assigned to one of the reference positions;

generates first information items each of which corresponds to a different one of the reference positions and indicates whether a three-dimensional point assigned to a reference position corresponding to the first information item is present;

selects, from among contexts, a first context for a first information item to be processed that is included in the first information items; and arithmetic-encodes the first information item to be processed, using the first context, each of the reference positions contains a first direction component and a second direction component, and each of the reference positions is a reference position to which no three-dimensional point is assigned or a reference position to which one or more three-dimensional points are assigned.

14. A three-dimensional data decoding device comprising:

a processor; and memory, wherein using the memory, the processor:

selects, from among contexts, a first context for an encoded first information item to be processed; and arithmetic-decodes the encoded first information item to be processed, using the first context, to generate a first information item to be processed, encoded first information items including the encoded first information item to be processed are included in a bitstream generated by encoding an information item about positions of three-dimensional points, the encoded first information items are generated by arithmetic-encoding first information items including the first information item to be processed, each of the three-dimensional points is assigned to one of a plurality of reference positions, each of the reference positions contains a first direction component and a second direction component, each of the reference positions is a reference position to which no three-dimensional point is assigned or a reference position to which one or more three-dimensional points are assigned, and the first information items each correspond to a different one of the reference positions and indicate whether a three-dimensional point assigned to a reference position corresponding to the first information item is present.

* * * * *